US008276712B2

(12) United States Patent
Smith et al.

(10) Patent No.: US 8,276,712 B2
(45) Date of Patent: Oct. 2, 2012

(54) SYSTEMS FOR USE WITH MULTIPLE SAFETY DEVICES AND CONNECTORS FOR USE THEREWITH

(75) Inventors: Hugh Smith, Franklin, PA (US); Douglas Mercier, Mars, PA (US); Ross Balquist, Slippery Rock, PA (US); Brian Montgomery, Mercer, PA (US); Thomas W. Parker, Jamestown, PA (US); Preston L. Anderson, Cranberry, PA (US)

(73) Assignee: Honeywell International Inc., Morristown, NJ (US)

(*) Notice: Subject to any disclaimer, the term of this patent is extended or adjusted under 35 U.S.C. 154(b) by 688 days.

(21) Appl. No.: 12/392,085

(22) Filed: Feb. 24, 2009

(65) Prior Publication Data

US 2009/0211849 A1 Aug. 27, 2009

Related U.S. Application Data

(60) Provisional application No. 61/031,351, filed on Feb. 25, 2008, provisional application No. 61/042,839, filed on Apr. 7, 2008.

(51) Int. Cl.
*A62B 1/10* (2006.01)
(52) U.S. Cl. .............. 182/3; 182/231; 182/232; 119/796
(58) Field of Classification Search .............. 182/3, 231, 182/232; 119/796
See application file for complete search history.

(56) References Cited

U.S. PATENT DOCUMENTS

| 481,730 | A | * | 8/1892 | Miller | 482/127 |
| 2,959,414 | A | * | 11/1960 | Saltz | 482/127 |
| 3,022,855 | A | * | 2/1962 | Lewis | 182/3 |
| 3,999,752 | A | * | 12/1976 | Kupperman et al. | 482/131 |
| 4,205,839 | A | * | 6/1980 | Best | 482/131 |
| 4,407,392 | A | * | 10/1983 | Lazzari | 182/128 |
| 4,765,558 | A | * | 8/1988 | Higbee | 242/382.2 |
| 4,877,110 | A | * | 10/1989 | Wolner | 182/232 |
| 4,942,943 | A | * | 7/1990 | Flaherty | 182/231 |
| 4,961,573 | A | * | 10/1990 | Wehrell | 482/74 |
| 5,287,943 | A | * | 2/1994 | Bell | 182/3 |
| D350,795 | S | * | 9/1994 | Barbour | D21/692 |
| 5,358,461 | A | * | 10/1994 | Bailey, Jr. | 482/2 |
| 5,509,873 | A | * | 4/1996 | Corn | 482/74 |

(Continued)

FOREIGN PATENT DOCUMENTS

DE 29922991 7/2000

(Continued)

*Primary Examiner* — Alvin Chin Shue
*Assistant Examiner* — Colleen M Chavchavadze
(74) *Attorney, Agent, or Firm* — Wood, Phillips, Katz, Clark & Mortimer

(57) ABSTRACT

A system includes a support including an extending rigid member and a first attachment at a first position on the rigid member to which a first self-retracting lifeline is attached. The first self-retracing lifeline includes a first housing from which a first lifeline exits. The first housing is movable relative to the rigid member. The system also includes at least a second attachment at a second position on the rigid member to which a second self-retracing lifeline. The second self-retracting lifeline includes a second housing from which a second lifeline exits. The second housing is movable relative to the rigid member independent of the movement of the first housing. The first position is spaced from the second position. The system further includes a connector attached to the frame to connect the frame to an article (for example, a safety harness such as a full body safety harness) worn by a user.

25 Claims, 31 Drawing Sheets

U.S. PATENT DOCUMENTS

| | | | |
|---|---|---|---|
| 5,522,472 A * | 6/1996 | Shuman et al. | 182/3 |
| 5,771,993 A | 6/1998 | Anderson | |
| 6,073,724 A * | 6/2000 | Wolner et al. | 182/3 |
| 6,260,513 B1 * | 7/2001 | Younkin | 119/771 |
| 6,520,290 B1 * | 2/2003 | Carter | 182/36 |
| 6,964,319 B2 * | 11/2005 | Anderson | 182/235 |
| 7,395,984 B2 * | 7/2008 | Szarkowski et al. | 242/384 |
| 7,874,970 B2 * | 1/2011 | Glisan | 482/124 |
| 7,946,387 B2 * | 5/2011 | Betcher et al. | 182/231 |
| 2005/0263103 A1 | 12/2005 | Updyke | |
| 2007/0151805 A1 | 7/2007 | Betcher | |
| 2008/0042000 A1 * | 2/2008 | Horton | 242/382 |
| 2011/0180017 A1 * | 7/2011 | Goldenberg | 119/796 |

FOREIGN PATENT DOCUMENTS

| | | |
|---|---|---|
| WO | WO2004020043 A1 | 3/2004 |
| WO | WO2009108627 A1 | 9/2009 |
| WO | WO2009108646 A2 | 9/2009 |
| WO | WO2009108648 A3 | 9/2009 |

* cited by examiner

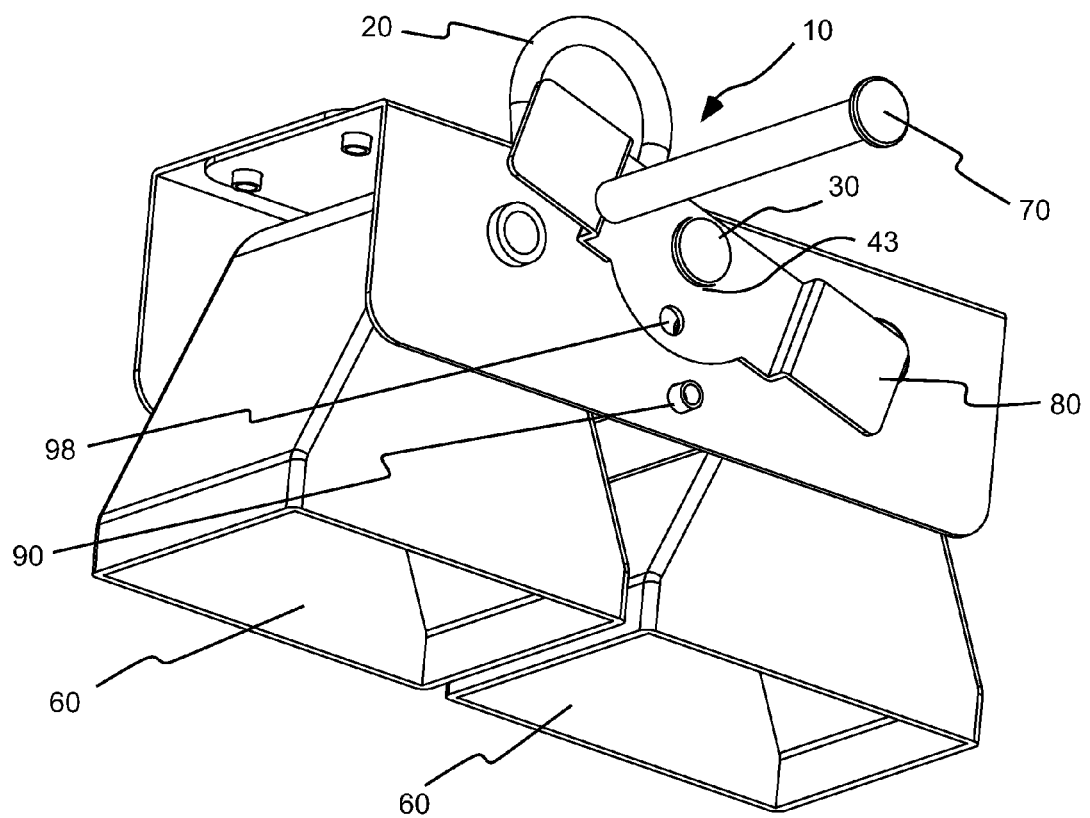
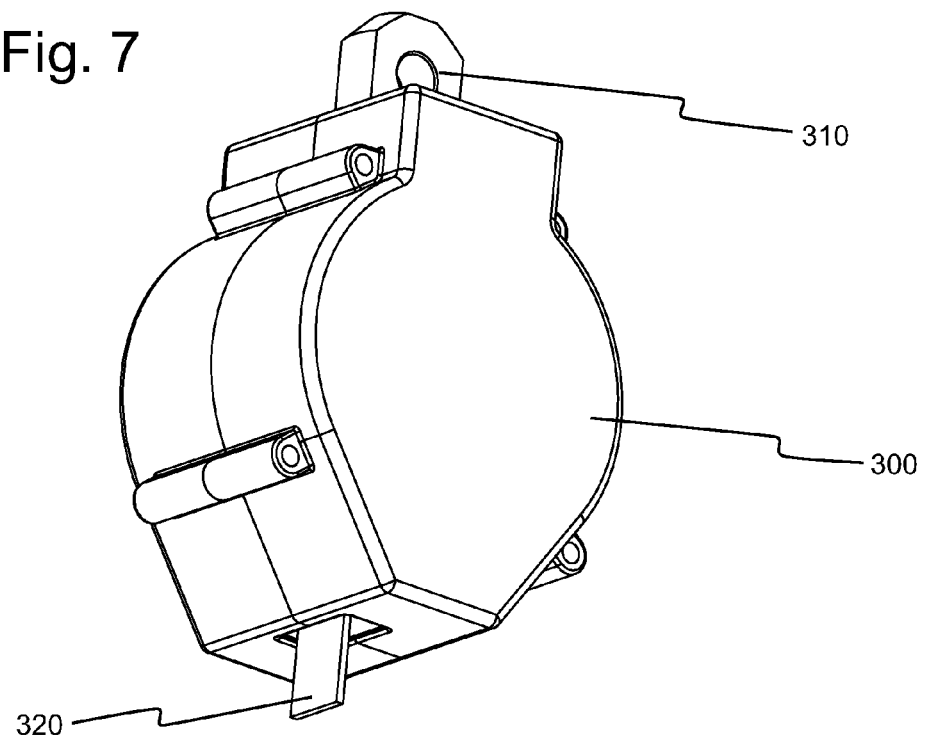
Fig. 7

Fig. 8
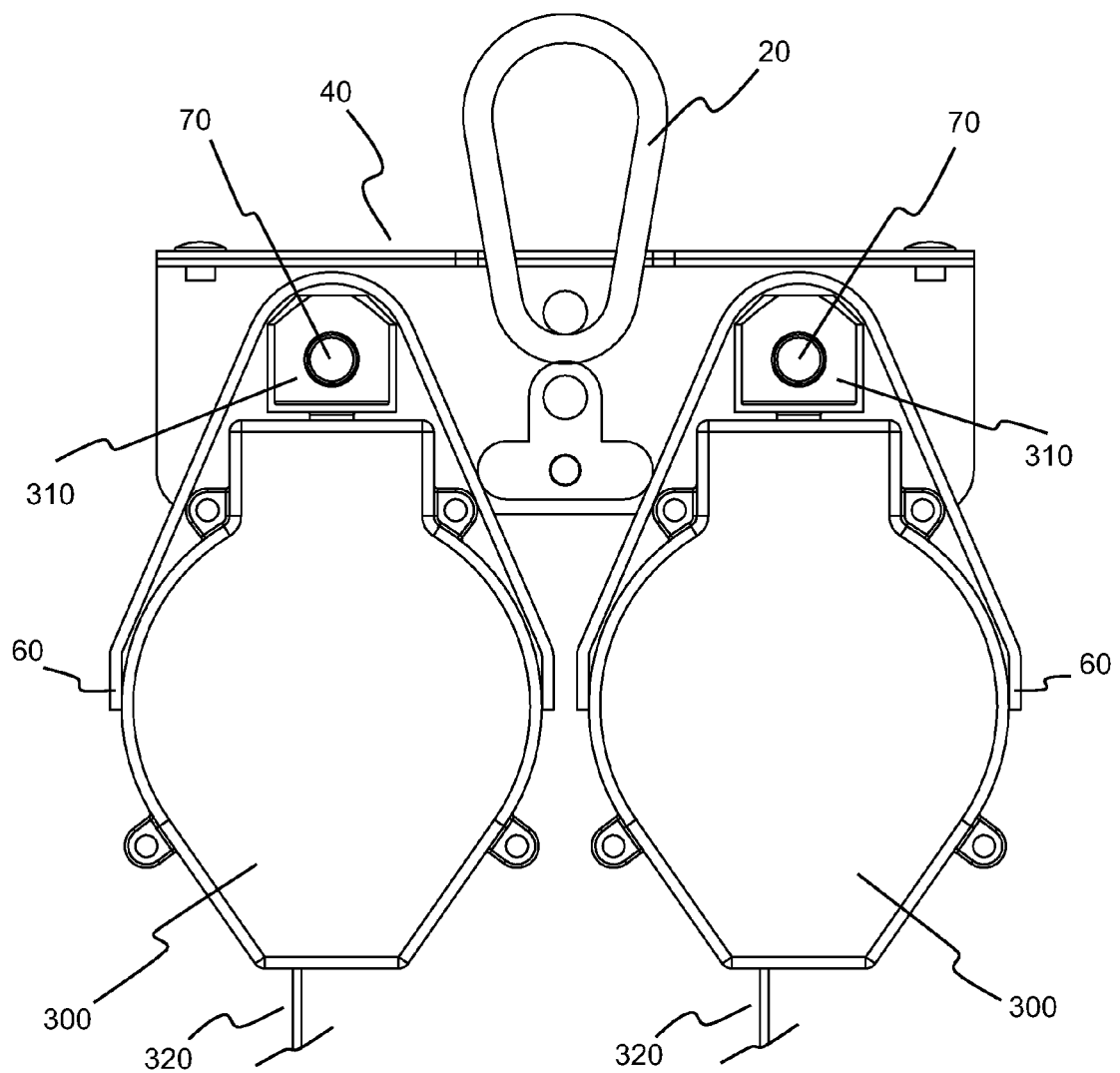
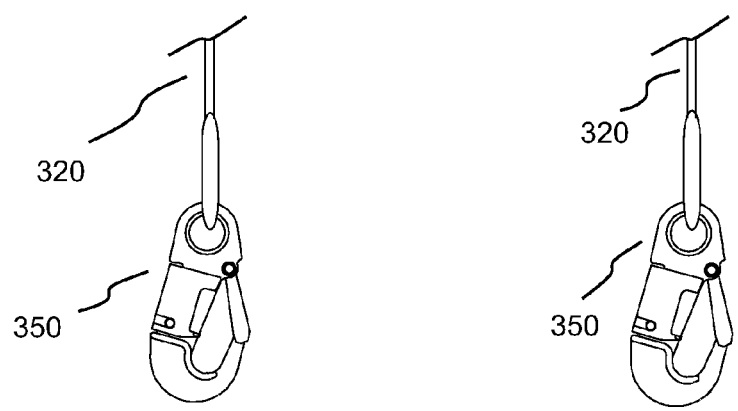

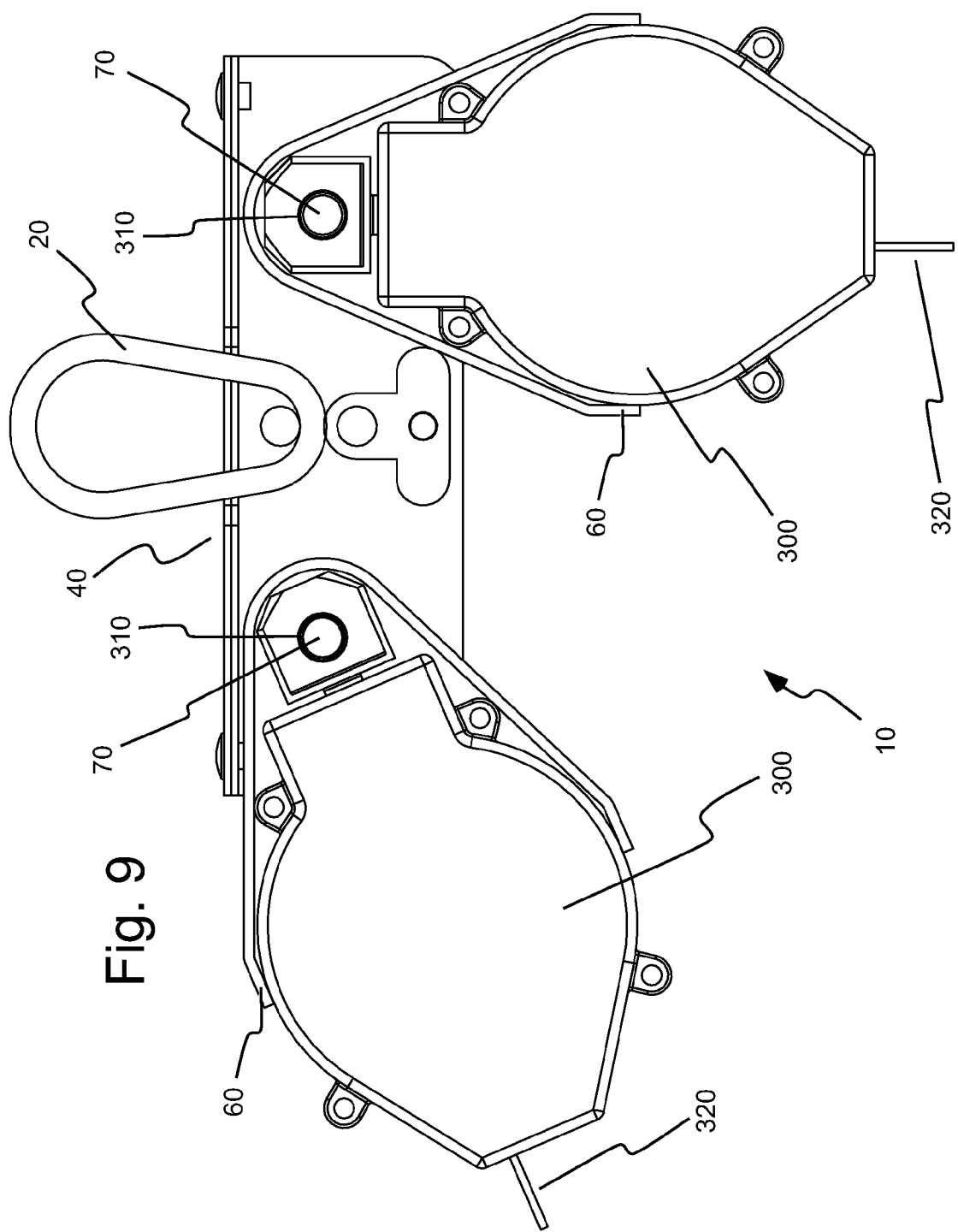

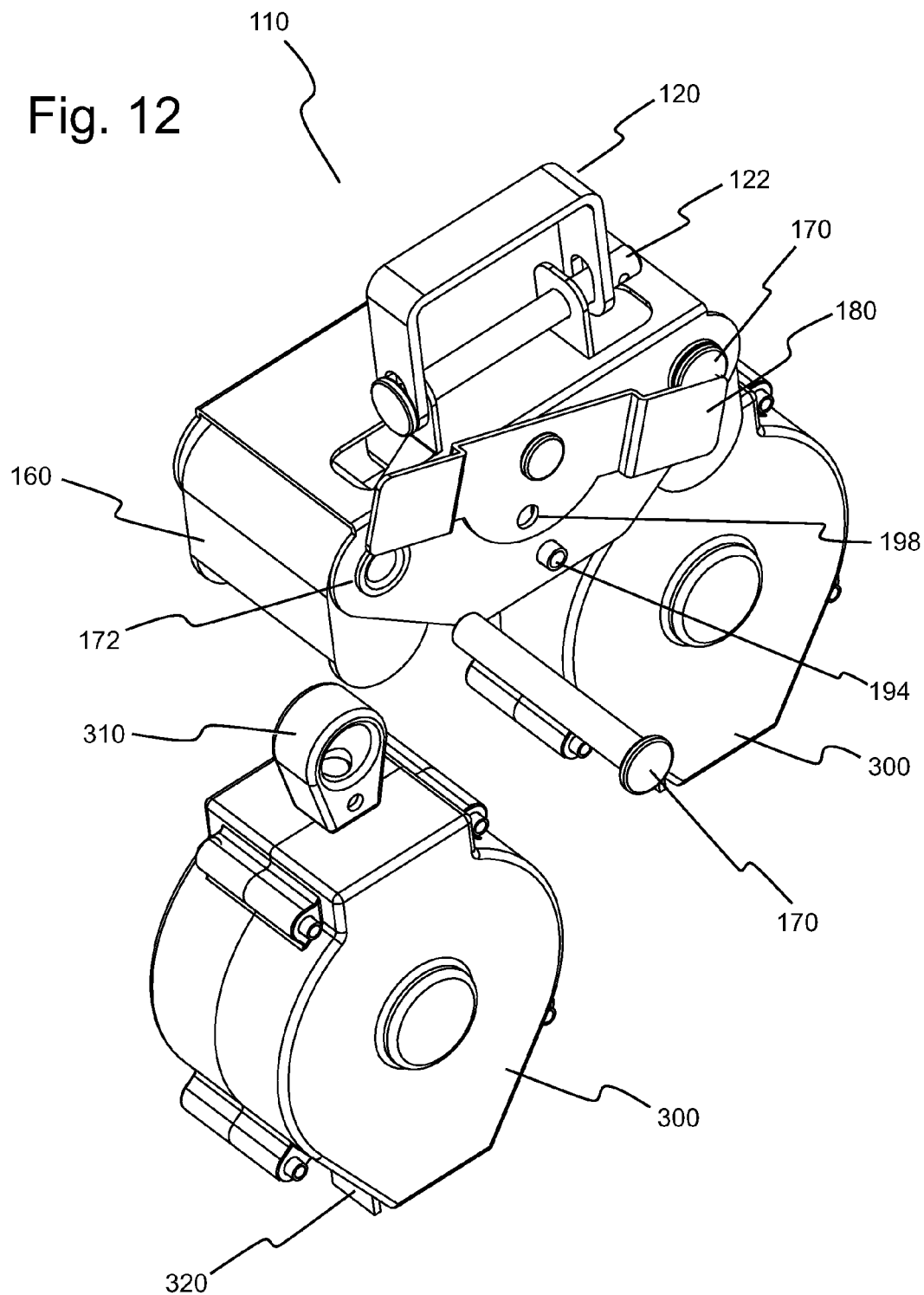

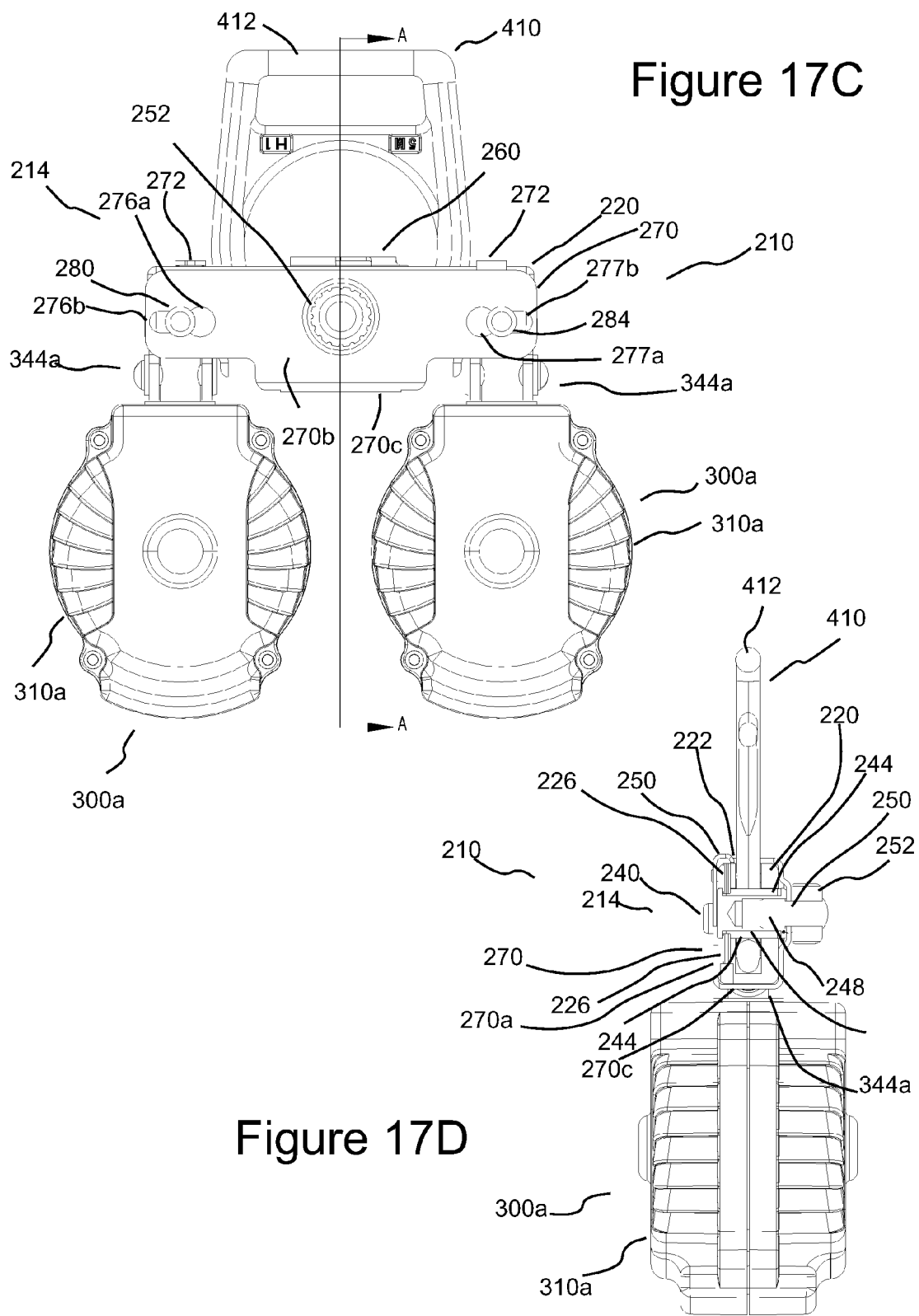

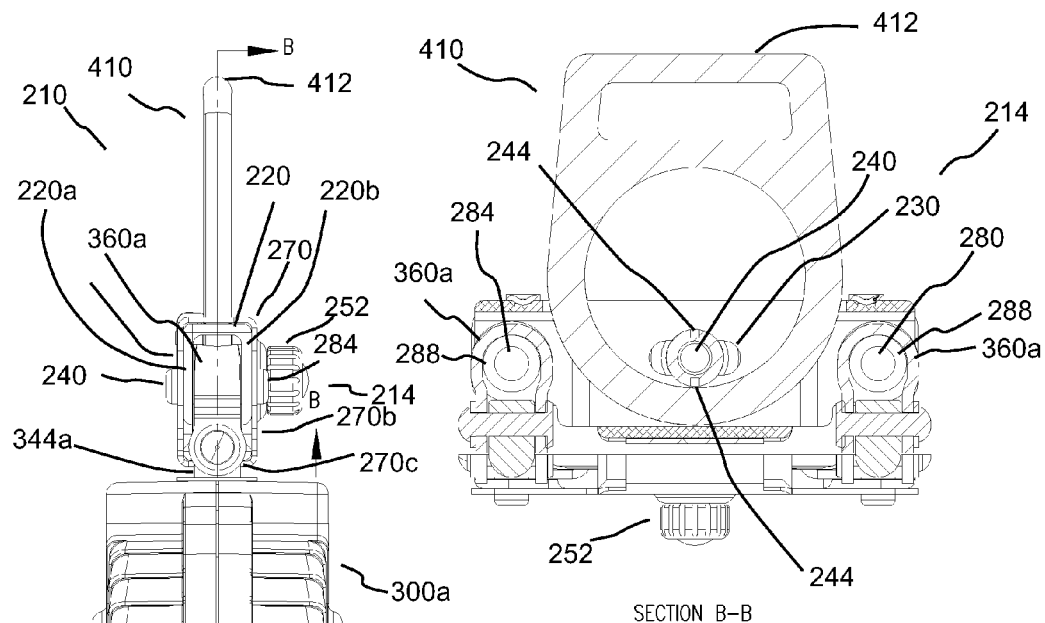
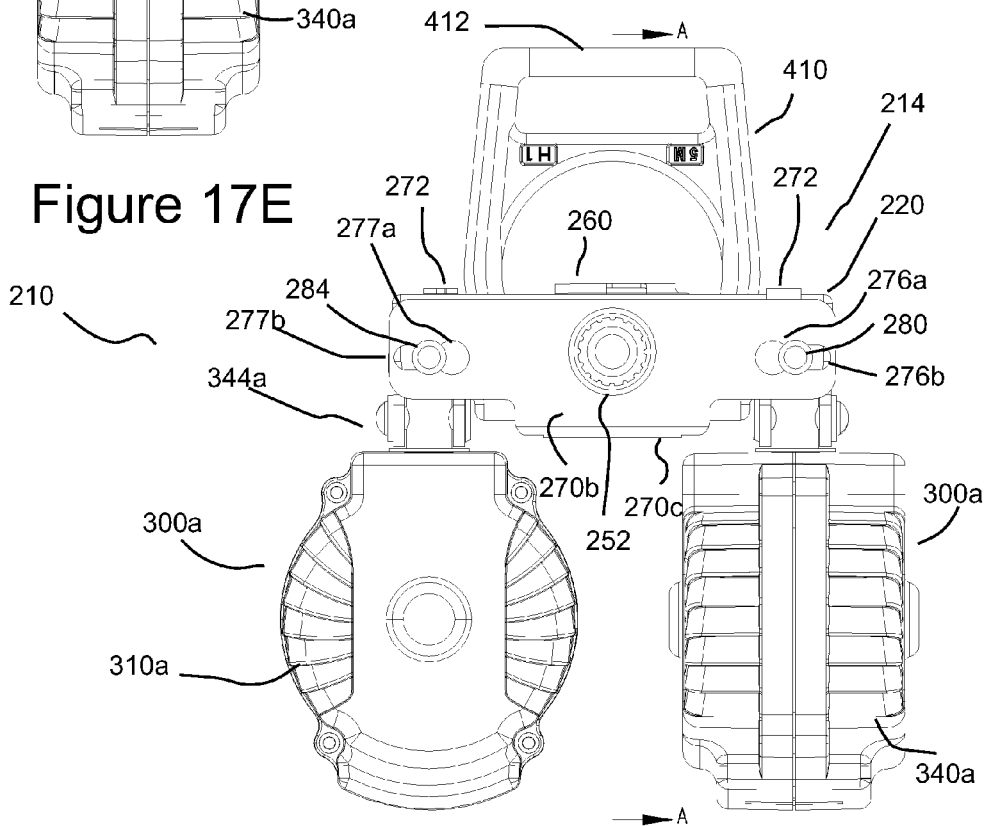

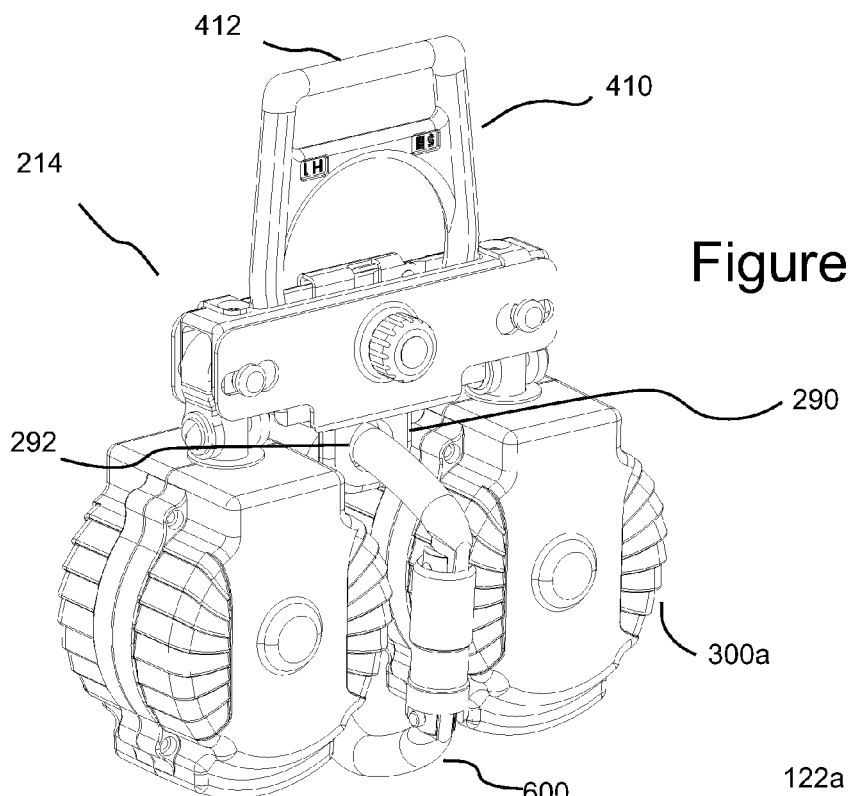
Figure 21
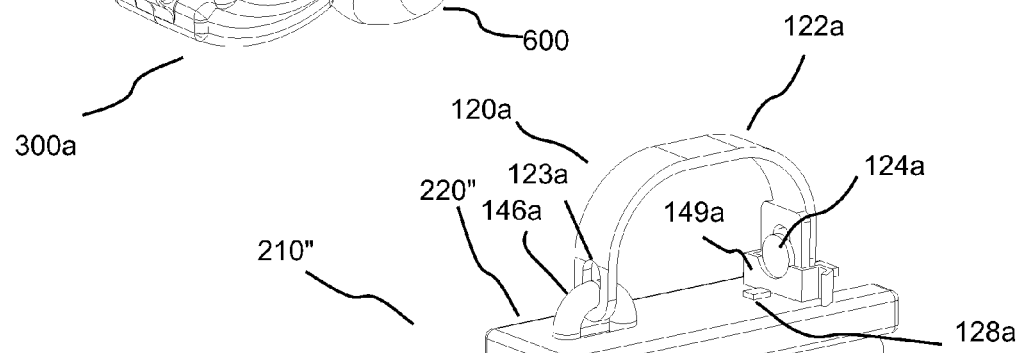
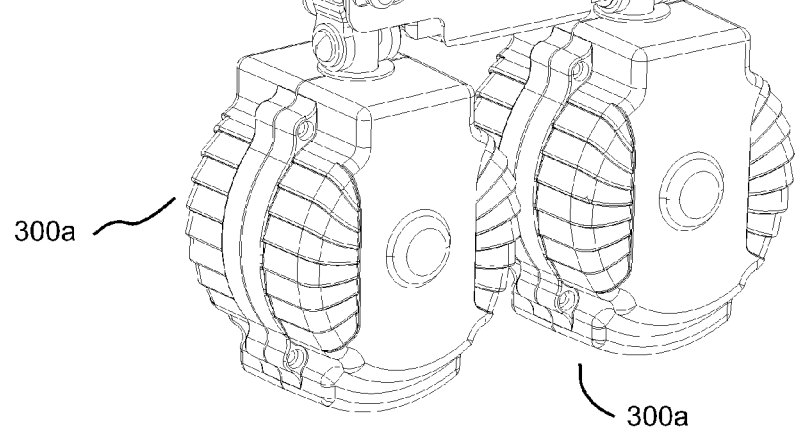
Figure 22A

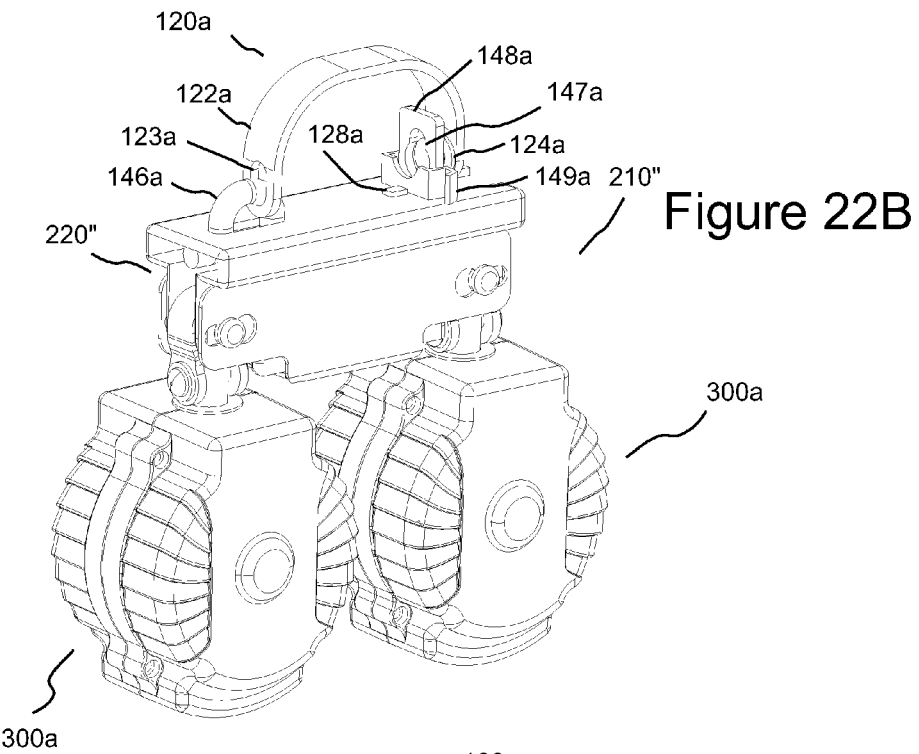
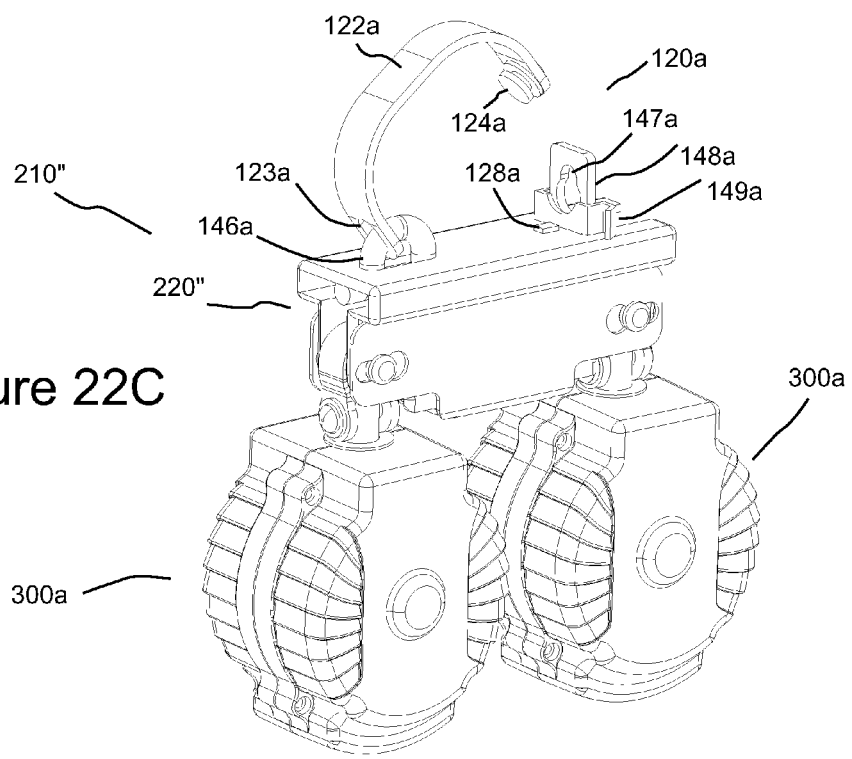

SYSTEMS FOR USE WITH MULTIPLE SAFETY DEVICES AND CONNECTORS FOR USE THEREWITH

CROSS-REFERENCE TO RELATED APPLICATION

This application claims benefit of U.S. Provisional Patent Application Ser. No. 61/031,351, filed Feb. 25, 2008, and U.S. Provisional Patent Application Ser. No. 61/042,839, filed Apr. 7, 2008, the disclosures of which is incorporated herein by reference.

BACKGROUND OF THE INVENTION

The present invention relates to systems for use with multiple safety devices such as self-retractable lifeline systems or self-retracting lanyard systems and connectors for use therewith, and, particularly, to systems enabling attachment of multiple self-retracting lifelines and to connectors for attaching multiple elements to a person wearing a safety harness.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosures of all references cited herein are incorporated by reference.

In certain situations wherein a person wearing a safety harness is moving through a work area in which there is a potential for falling, it can be desirable for the person to attach a first lanyard or lifeline to a first solid anchor point and then move to a second anchor point and attach a second lanyard or lifeline to the second anchor point. After attaching the second lifeline to the second anchor point, the person can return to the first anchor point and disconnect the first lifeline. The person can then move forward past the second anchor point to a third anchor point and attach the first lifeline to the third anchor point and so on. By repeating this sequence, the person can move through a work area while always being connected by at least one lifeline to a solid anchor point. The first lifeline can, for example, be a harness-mounted self retracting lifeline (SRL) and the second lifeline can, for example, be a second harness-mounted self-retracting lifeline. Such devices are know alternatively as self-retracting lifelines, self-retracting lanyards, fall arrest blocks, etc. and have been developed to limit a worker's free fall distance to a specified distance and limit fall arresting forces to a specified value. A self-retracting lifeline is, for example, disclosed in U.S. Pat. No. 5,771,993, the disclosure of which is incorporated herein by reference. Self-retracting lifelines are, for example, available from Sperian Fall Protection, Inc. of Franklin, Pa. under the product trademarks SCORPION® Personal Fall Limiters, BLACK RHINO® Self-Retracting Lifelines, MINI-LITE® Fall Limiters, FALCON® Self-Retracting Lifelines, and MIGHTYLITE® Self-Retracting Lifelines.

In general, most currently available self retracting lifeline safety devices or systems include a number of common components. Typically, a housing or cover provides enclosure/protection for the internally housed components. The housing includes attached thereto a connector for anchoring the self-retracting lifeline to either the user or to a fixed anchor point. The connector must be capable of withstanding forces required to stop a falling body of a given mass in a given distance.

A drum or spool around which a lifeline is coiled or spooled rotates within the housing. The drum is typically under adequate rotational tension to reel up excess extended lifeline without hindering the mobility of the user. Like the anchor connector and the other operative components of the retractable lifeline safety device, the drum is typically formed to withstand forces necessary to stop a falling body of a given mass in a given distance. The lanyard or lifeline is attached at one end thereof to the drum to allow the drum to reel in excess lifeline. The lifeline is attached at the other end thereof to either the user or to an anchorage point, whichever is not already attached to the housing.

Self-retracting lifeline systems also include a mechanism which locks (that is, prevents rotation of) the drum assembly of the self-retracting lifeline upon indication that a fall is occurring. For example, when the rope, cable or web being pulled from the self-retracting lifeline system causes the drum assembly to rotate above a certain angular velocity or experience an angular acceleration above a certain level, a brake mechanism can cause the drum assembly to suddenly lock.

At least one currently available, harness-mounted device includes two independently operating lifeline retraction mechanisms built into a single frame and housing. However, there are a number of disadvantages associated with such a device. For example, when a user is moving horizontally, the webbing of the lifelines makes a 90 degree bend when entering or exiting the device, making extension of the lifeline difficult. There is, for example, often an inability to align with both anchor points during a transition form one anchor point to another. Bends in one of the lifelines can also prevent automatic retraction of the lifeline, allowing extra slack in the lifeline, and potentially increasing the free fall distance of the user. Additionally, if either retraction mechanism of the device becomes inoperative, the entire unit must be discarded or returned to the manufacturer for repair. Furthermore, manufacture of such a device requires the production of specialized sets of left and right hand parts which are unique to the device, while performing the complex functions of a self retracting lifeline or SRL.

Moreover, for a variety of situations including fall protection, travel restraint and rescue, there is a desire to have the ability to connect multiple safety devices to a single worker on a single connection to a harness. An example is the need to attach both a shock absorbing lanyard and self retracting lifeline to the same back D-Ring. Current embodiments of devices that allow connection of two devices require the use of an extension (for example, a length of webbing material) that creates a greater distance between the attached device(s) and the safety harness. This additional distance results in an increase in fall clearance as well as the ability for the devices to become twisted or intertwined or otherwise interfere with each other. There is also a restriction of the ability of each device to work and orient independently of each other.

It is desirable to develop improved devices, systems and methods that enable attachment of multiple self-retracting lifelines and other devices (particularly fall protection and rescue devices) to a person that reduce or eliminate the above-identified and/or other problems associated with current devices, systems and methods.

SUMMARY OF THE INVENTION

In one aspect, the present invention provides a system, including a support including an extending rigid member and a first attachment at a first position on the rigid member to which a first self-retracting lifeline is attached. The first retractable lifeline includes a first housing from which a first lifeline exits. The first housing can be movable relative to the rigid member. The system also includes at least a second attachment at a second position on the rigid member to which a second self-retracing lifeline is attached. The second self-retracting lifeline includes a second housing from which a second lifeline exits. The second housing can be movable relative to the rigid member independent of the movement of the first housing. The first position is spaced from the second position. The system further includes a connector attached to the frame to connect the frame to an article (for example, a safety harness such as a full body safety harness) worn by a user.

In several embodiments, the first self-retracting lifeline (including the first housing) is pivotably attached to the first attachment and the second self-retracing lifeline (including the second housing) is pivotably attached to the second attachment. The first self-retracting lifeline can, for example, be pivotable laterally with respect to the rigid member, and the second self-retracting lifeline can be pivotable laterally with respect to the rigid member.

The first attachment can, for example, be a first extending member (for example, a shaft or rod) about which the first self-retracting lifeline can pivot and the second attachment can be a second extending member (for example, a shaft or rod) about which the second self-retracting lifeline can pivot.

In several embodiments, the rigid member includes a frame including a first frame member and a second frame member spaced from the first frame member. The first extending member can extend between the first frame member and the second frame member at the first position, and the second extending member can extend between the first frame member and the second frame member at the second position.

The first extending member can be removably connectible between the first frame member and the second frame member and the second extending member can be removably connectible between the first frame member and the second frame member.

The system can further include at least one retaining element movably connected to the frame to selectively engage the first extending member to retain the first extending member between the first frame member and the second frame member. The retaining element can also be movably connected to the frame to selectively engage the second extending member to retain the second extending member between the first frame member and the second frame member.

In a number of embodiments, the retaining element is pivotably or slidably connected to the frame to a first retaining element position in which the retaining element retains each of the first extending member and the second extending member between the first frame member and the second frame member and to at least a second retaining element position in which at least one of the first extending member and the second extending member can be removed from between the first frame member and the second frame member to enable removal of the at least one of the first self-retracting lifeline and the second retracting lifeline from attachment to the frame. The retaining element can also be movable to at least a third retaining element position in which the other of the first extending member and the second extending member can be removed from between the first frame member and the second frame member to enable removal of the other of the first self-retracting lifeline and the second retracting lifeline from attachment to the frame.

In several embodiments, the system includes a third extending member extendible between the first frame member and the second frame member to connect to a cooperating connector attached to the article. The third extending member can, for example, be movably connected to the frame. The third extending member can be positioned on the frame at a position intermediate between the first extending member and the second extending member and generally equidistant from the first extending member and the second extending member (but not necessarily such that the axes of the extending member are collinear). The cooperating connector can be pivotable about the third extending member over a range of angles.

In a number of embodiments, the connector is at least partially disconnectible from the rigid member to connect to at least one strap of the article. The connector can, for example, include a connector member that is pivotably connected to the frame on a first end thereof and is removably connected to the frame member on a second end thereof.

The connector member can include an engagement member in the vicinity of the second end thereof that is operable to removably connect to a cooperating engagement member attached to the frame. The engagement member can, for example, include an extending member that engages a seating in the cooperating engagement member.

The connector can further include a latch system to engage at least one of the engagement member and the cooperating engagement member to prevent disengagement of the engagement member and the cooperating engagement member when the latch system is in a closed state.

In several embodiments, the first self-retracting lifeline and the second self-retracting lifeline are positioned generally side by side when attached to the rigid member.

The system can further include the article, and the article can, for example, be a safety harness.

The system can further include the first self-retracting lifeline and the second self-retracting lifeline.

In several embodiments, the first retractable lifeline includes a first connector including a first passage through which the first extending member passes to pivotably attach the first retractable lifeline to the rigid member. The second retractable lifeline can also include a second connector including a second passage through which the second extending member passes to pivotably attach the second retractable lifeline to the rigid member. The first housing can, for example, be pivotable or rotatable about a longitudinal axis of the first housing relative to the first connector. Likewise, the second housing can be pivotable or rotatable about a longitudinal axis of the second housing relative to the second connector. The first housing can be pivotable or rotatable relative to the first connector about an axis generally perpendicular to the longitudinal axis of the first housing. The second housing can also be pivotable or rotatable relative to the second connector about an axis generally perpendicular to the longitudinal axis of the second housing.

In another aspect, the present invention provides a system including a support including a rigid member and a first attachment to which a first self-retracting lifeline is removably attachable. The first attachment is positioned on the rigid member at a first position. The system further includes at least a second attachment to which a second self-retracing lifeline is removably attachable. The second attachment is positioned on the rigid member at a second position. The first position is spaced from the second position. The system also includes a connector attached to the support to connect the support to an article to be worn by a user.

The first attachment can be adapted to attach the first self-retracting lifeline to the rigid member so that a first housing of the first self-retracting lifeline is movable relative to the rigid member (and relative to a second housing of the second self-retracting lifeline). Likewise, the second attachment can be adapted to attach the second self-retracting lifeline to the rigid member so that the second housing of the second self-retracting lifeline is movable relative to the rigid member (and relative to the first housing of the first self-retracting lifeline).

In several embodiments, the first attachment is a first extending member about which the first self-retracting lifeline (including the first housing) can pivot and the second attachment is a second extending member about which the second self-retracting lifeline (including the second housing) can pivot. The first attachment can, for example, include a first extending member (for example, a shaft), and the second attachment can include a second extending member (for example, a shaft).

In several embodiments, the rigid member includes a frame including a first frame member and a second frame member spaced from the first frame member. The first extending member can, for example, extend between the first frame member and the second frame member at the first position, and the second extending member can, for example, extend between the first frame member and the second frame member at the second position.

The first extending member can be removably connectible between the first frame member and the second frame member, and the second extending member can be removably connectible between the first frame member and the second frame member.

The system can further include at least one retaining element movably connected to the frame to selectively engage the first shaft to retain the first shaft between the first frame member and the second frame member as described above.

In several embodiments, the harness connector includes a third extending member or shaft extendible between the first frame member and the second frame member to connect to a connector ring attached to the harness. The third extending member can, for example, be movably connected to the frame. The third extending member can be positioned on the frame at a position intermediate between the first extending member and the second extending member and generally equidistant from the first extending member and the second extending member as described above. Such positioning can, for example, balance the weight of attached self-retracting lifelines.

In several embodiments, the connector is at least partially disconnectible from the rigid member to connect to at least one strap of the safety harness.

In several embodiments, the connector includes a connector member that is pivotably connected to the frame on a first end thereof and is removably connected to the frame member on a second end thereof. The connector member can, for example, include an engagement member in the vicinity of the second end thereof that is operable to removably connect to a cooperating engagement member attached to the frame. The engagement member can, for example, include an extending member that engages a seating in the cooperating engagement member. The connector can further include a latch system to engage at least one of the engagement member and the cooperating engagement member to prevent disengagement of the engagement member and the cooperating engagement member when the latch system is in a closed state.

The first self-retracting lifeline and the second self-retracting lifeline can, for example, be positioned generally side by side when attached to the rigid member.

The system can further include the first self-retracting lifeline and the second self-retracting lifeline as described above.

In another aspect, the present invention provides a method of connecting at least two self-retracting lifelines to a safety harness wearable by a person, including: connecting a support to the safety harness, the support including a rigid member including a first attachment to which a first self-retracting lifeline is attachable so that a first housing of the first self-retracting lifeline from which a first lifeline exits is movable relative to the rigid member, the first attachment being positioned on the rigid member at a first position, and at least a second attachment to which a second self-retracing lifeline is attachable so that a second housing of the second self-retracting lifeline from which a second lifeline exits is movable relative to the rigid member, the second attachment being positioned on the rigid member at a second position, the first position being spaced from the second position. The method can further include attaching the first self-retracting lifeline to the first attachment; and attaching the second self-retracting lifeline to the second attachment. The actions of the method need not be performed in any particular sequence.

At least one of the first self-retracting lifeline and the second self-retracting lifeline can, for example, be attached to the rigid member before the support is connected to the safety harness. Further, the first self-retracting lifeline and the second self-retracing lifeline can be non-removably attached to the first attachment and the second attachment.

In another aspect, the present invention provides a system including a first self-retracting lifeline, a second self-retracting lifeline and a support. The support includes a rigid member and a first attachment at a first position on the rigid member to which the first self-retracting lifeline including a first housing is attachable. A first housing of the first self-retracting lifeline is movable relative to the rigid member after attachment of the first self-retracting lifeline to the first attachment. The system further includes at least a second attachment at a second position on the rigid member to which the second self-retracing lifeline including a second housing is attachable. A second housing of the second self-retracting lifeline is movable relative to the rigid member after attachment of the second self-retracting lifeline to the second attachment. The first position is spaced from the second position. The system further includes a connector attached to the support to connect the support to an article (for example, a safety harness) to be worn by a person.

The first self-retracting lifeline can, for example, be pivotably attached to the first attachment, and the second self-retracing lifeline can, for example, be pivotably attached to the second attachment. The first self-retracting lifeline can be pivotable independent of the second self-retracting lifeline.

In another aspect, the present invention provides a system including a safety harness and a support including a rigid member. The system further includes a first attachment to which a first self-retracting lifeline is removably attachable. The first attachment can be positioned on the rigid member at a first position. The system also includes at least a second attachment to which a second self-retracing lifeline is removably attachable. The second attachment is positioned on the rigid member at a second position. The first position is spaced from the second position. The system further includes a harness connector attached to the support to connect the support to the safety harness/system. The system can further include the first self-retracting lifeline and the second self-retracting lifeline.

In a further aspect, the present invention provides a system including a safety harness and a support including a rigid member. The system further includes a first attachment at a first position on the rigid member to which a first self-retracting lifeline including a first housing is attachable. The first housing is movable (for example, pivotable) relative to the rigid member after attachment to the first attachment. The system also includes at least a second attachment at a second position on the rigid member to which a second self-retracing lifeline including a second housing is attachable. The second housing is movable (for example, pivotable) relative to the rigid member after attachment to the second attachment. The first position is spaced from the second position. The system further includes a harness connector attached to the support to connect the support to the safety system. The system can further include the first self-retracting lifeline and the second self-retracting lifeline. The self-retracting lifeline can be removably attachable to the attachments or can be permanently or non-removably attachable to the attachments.

In another aspect, the present invention provides a system for use with a safety system to be worn by a person including: a support comprising a rigid member, a first attachment to which a first safety device is removably attachable, the first attachment being positioned on the rigid member at a first position, and at least a second attachment to which a second safety device is removably attachable, the second attachment being positioned on the rigid member at a second position, the first position being spaced from the second position; and a safety system connector attached to the support to connect the support to the safety system.

The rigid member can, for example, include a frame including a first frame member and a second frame member spaced from the first frame member. The safety device connector can, for example, include a shaft extending between the first frame member and the second frame member.

In another aspect, the present invention provides a safety device (for example, a fall protection safety device) including a connector including a connector member that is pivotably connected to the safety device on a first end thereof and is removably connected to the safety device on a second end thereof. The connector member includes an engagement member in the vicinity of the second end thereof that is operable to removably connect to a cooperating engagement member attached to the safety device.

The engagement member can, for example, include an extending member that engages a seating in the cooperating engagement member.

The connector can further include a latch mechanism or system to engage at least one of the engagement member and the cooperating engagement member to prevent disengagement of the engagement member and the cooperating engagement member when the latch is in a closed state.

In several embodiments, the cooperating engagement member includes a first opening in communicative connection with a larger second opening, and the engagement member includes a flange that is dimensioned to pass through the second larger opening but not through the first opening. The latch system can, for example, prevent the engagement member (for example, a flange) from being aligned with the second opening when in the closed state.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 7 illustrates a perspective view of the retractable lifeline support system of FIG. 1 wherein a pin retainer has been pivoted to one side, allowing a seating pin to be withdrawn for connection of a retractable lifeline to the support.

FIG. 8 illustrates a front cutaway view of the retractable lifeline support system of FIG. 1 wherein two self-retracting lifelines have been attached thereto.

FIG. 9 is another front cutaway view of the retractable lifeline support system of FIG. 1 wherein one of the two installed self-retracting lifelines has been pivoted, rotated or swung to the side.

FIG. 12 illustrates a perspective view of the retractable lifeline support system of FIG. 10A wherein a pin retainer has been pivoted to one side, allowing a seating pin to be withdrawn for connection or removal of a retractable lifeline.

FIG. 17C illustrates a rear view of the system of FIG. 17A.

FIG. 17D illustrates a side, partially cutaway view (along section A-A of FIG. 17C) of the system of FIG. 17A.

FIG. 17E illustrates a side view of the system of FIG. 17A.

FIG. 17F illustrates a cross-section view of a portion of the system of FIG. 17A along section B-B of FIG. 17E.

FIG. 17G illustrates a front view of the system of FIG. 17A wherein one of the attached self-retracting lifelines has been rotated about its central, longitudinal axis independent of the position of the other self-retracting lifeline.

FIG. 21 illustrates a rear perspective view of another embodiment of a retractable lifeline support system of the present invention in which the connector thereof includes a connection member in the form of a carabiner.

FIG. 22A illustrates a perspective view of another embodiment of a retractable lifeline support system of the present invention having a connector similar to that of FIG. 16A that is operable to connect the support system to, for example, safety harness strapping without an intervening connector.

FIG. 22B illustrates a perspective view of the retractable lifeline support system of FIG. 22A wherein the connector in unlatched during opening of the connector.

FIG. 22C illustrates a perspective view of the retractable lifeline support system of FIG. 22A wherein the connector is opened.

DETAILED DESCRIPTION OF THE INVENTION

Figure 1:
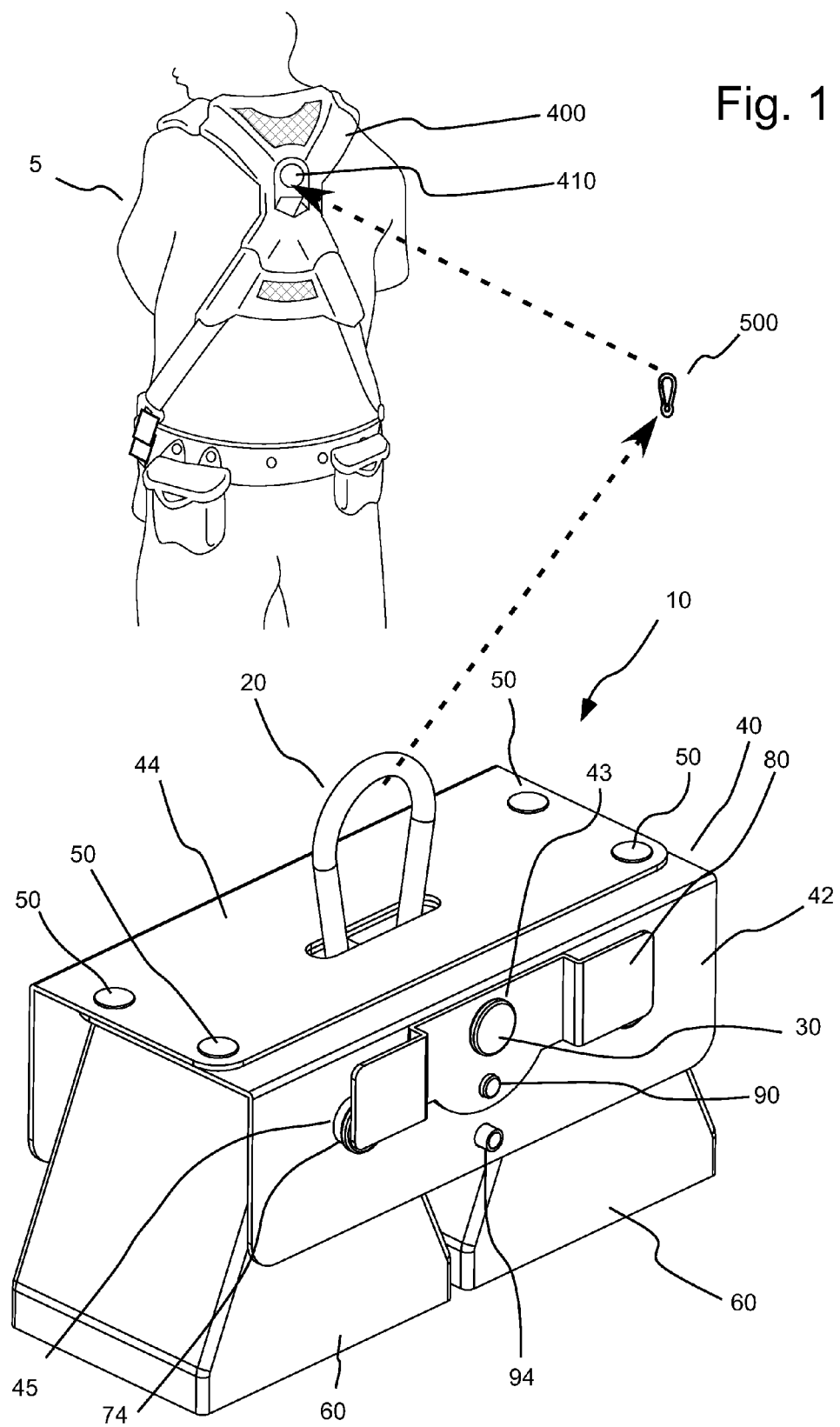
FIG. 1 illustrates is a front perspective view of an embodiment of a retractable lifeline support system of the present invention.

The devices, systems and methods of the present invention reduce or eliminate a number of problems associated with currently available systems while providing highly functional, multiple safety device (for example, multiple self-retracting lifeline) systems for use by persons performing in situations wherein there is a risk of injury from a fall.

As used herein and in the appended claims, the singular forms "a," "an", and "the" include plural references unless the content clearly dictates otherwise. Thus, for example, reference to "a connector" includes a plurality of such connectors and equivalents thereof known to those skilled in the art, and so forth, and reference to "the connector" is a reference to one or more such connectors and equivalents thereof known to those skilled in the art, and so forth.

FIGS. 1 through 9 illustrate one embodiment of a support system 10 of the present invention for placing multiple self-retracting lifelines 300 (see, for example, FIG. 8) and/or other safety devices in operative association with a person. In the illustrated embodiment, two self-retracting lifelines 300 are attachable to support system 10. Support system 10 includes a safety device (for example, safety harness) connector 20 in the form of, for example, a loop or ring which can, for example, be movably, rotatably or pivotably retained within support system 10 by an attachment such as a pivot pin or rod 30 (see, for example, FIGS. 1 and 5). Connector 20 can, for example, be connected to a D-ring 410 safety harness 400, via an intervening connector such as a carabiner or snap hook 500 (see FIG. 1). Connector 20 can alternatively be formed to be directly and removably connectable to a safety harness attachment member such as D-ring 410.

In the illustrated embodiment, support system 10 includes a rigid member such as a frame 40 which is formed by an L-shaped front frame member 42 and an L-shaped rear frame member 44, which are connected by connectors 50 (for example, rivets) to form generally U-shaped frame 40. Pivot pin 30 can, for example, pass through passages 43 in each of frame members 42 and 44 to be retained in connection with frame 40.

Figure 2:
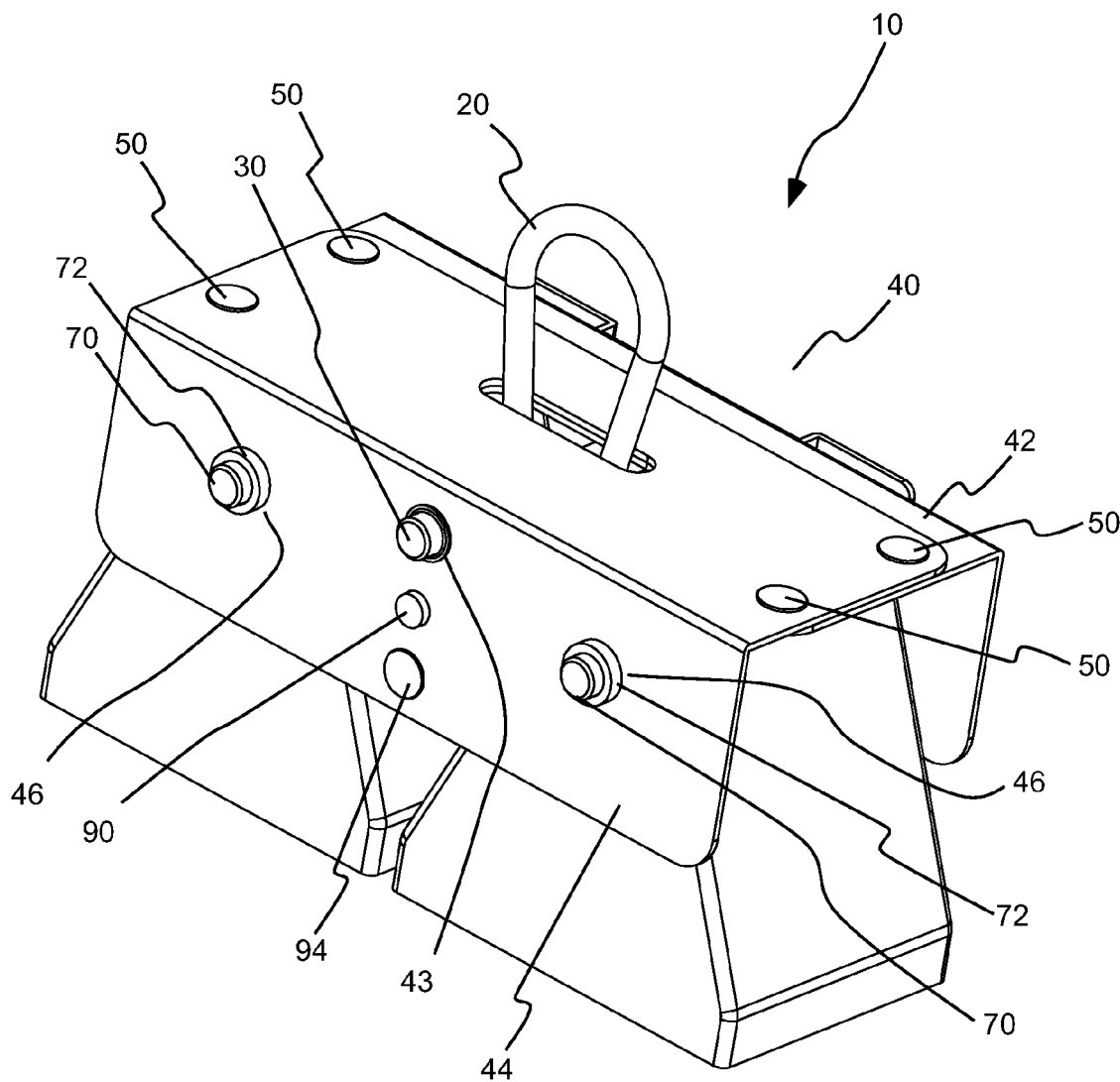
FIG. 2 illustrates a rear perspective view of the retractable lifeline support system of FIG. 1.
Figure 3A:
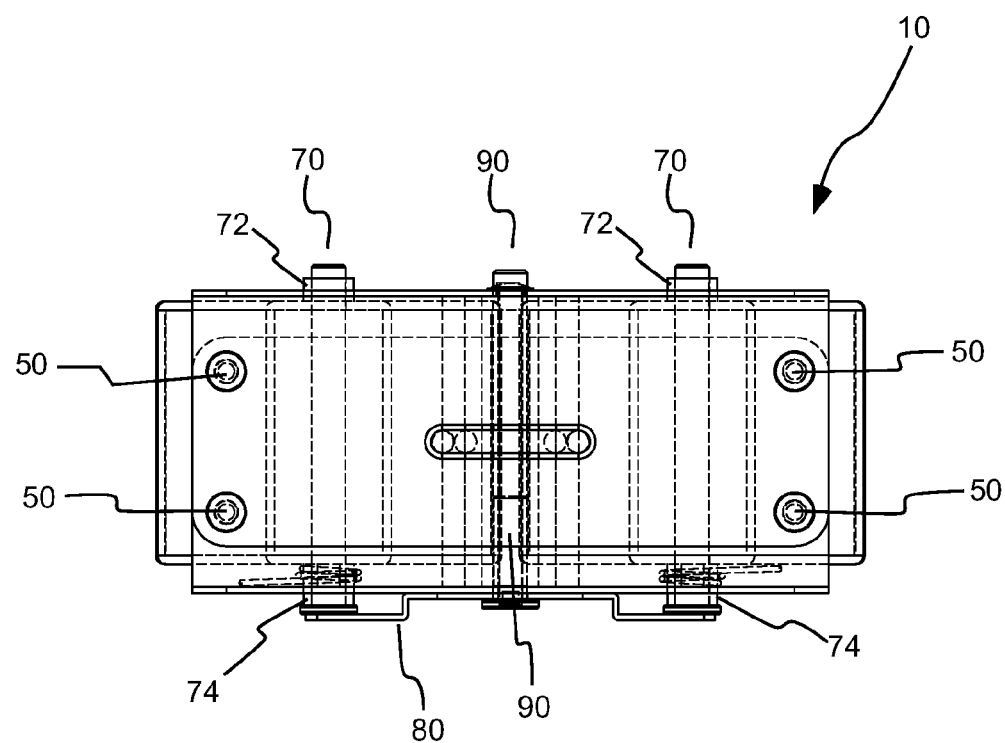
FIG. 3A illustrates a top hidden line view of the retractable lifeline support system of FIG. 1.
Figure 4A:
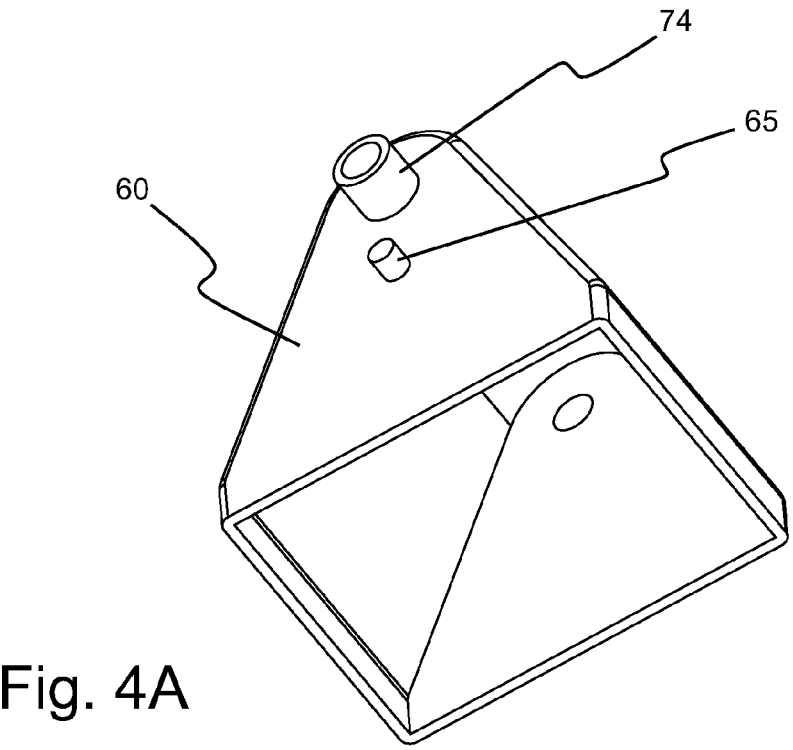
FIG. 4A illustrates a bottom perspective view of a retractable lifeline seating of the retractable lifeline support system of FIG. 1.
Figure 4B:
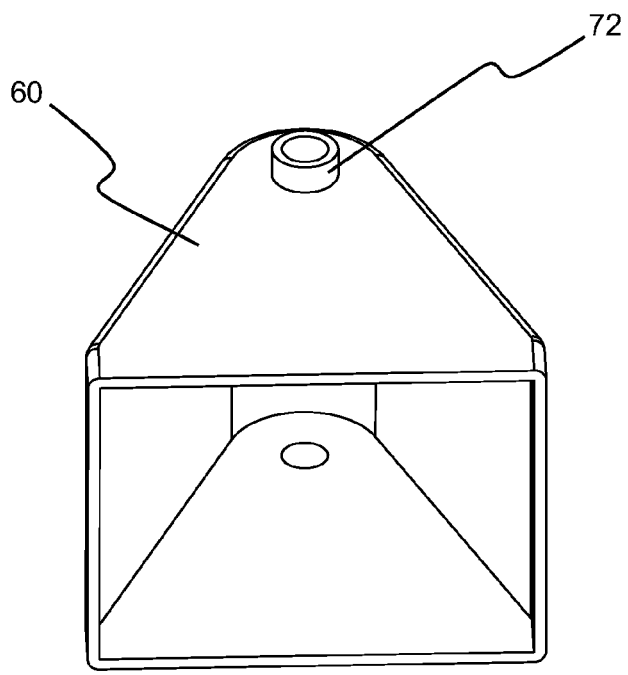
FIG. 4B illustrates another bottom perspective view of a retractable lifeline seating of the retractable lifeline support system of FIG. 1.

In the illustrated embodiment, two generally identical retractable lifeline seatings 60 are retained in rotatable or pivotable connection with frame 40 via extending members or connectors such as seating or attachment pins, shafts or rods 70 (see, for example, FIGS. 2 and 3A). FIGS. 4A and 4B show perspective views of the seating 60. In the illustrated embodiment, an elongated member or collar 74 extends from the front face of the seating 60. A shorter member or collar 72 extends from the rear face of the seating 60. An abutment member or stud 65 also extends from the front face of the seating 60 (see, for example, FIG. 4A). When assembled, long collar 74 passes through a hole 45 in the front frame member 42 while short collar 72 passes through a hole 46 in the rear frame member 44. Seatings 60 pivot or rotate on or about short collar 72 and long collar 74 (which share a common axis) relative to the front frame member 42 and rear frame member 44. Seating pins 70 slide through center holes in the short collar 72 and long collar 74 to form a connection with a self-retracting lifeline 60 as described further below.

Figure 5:
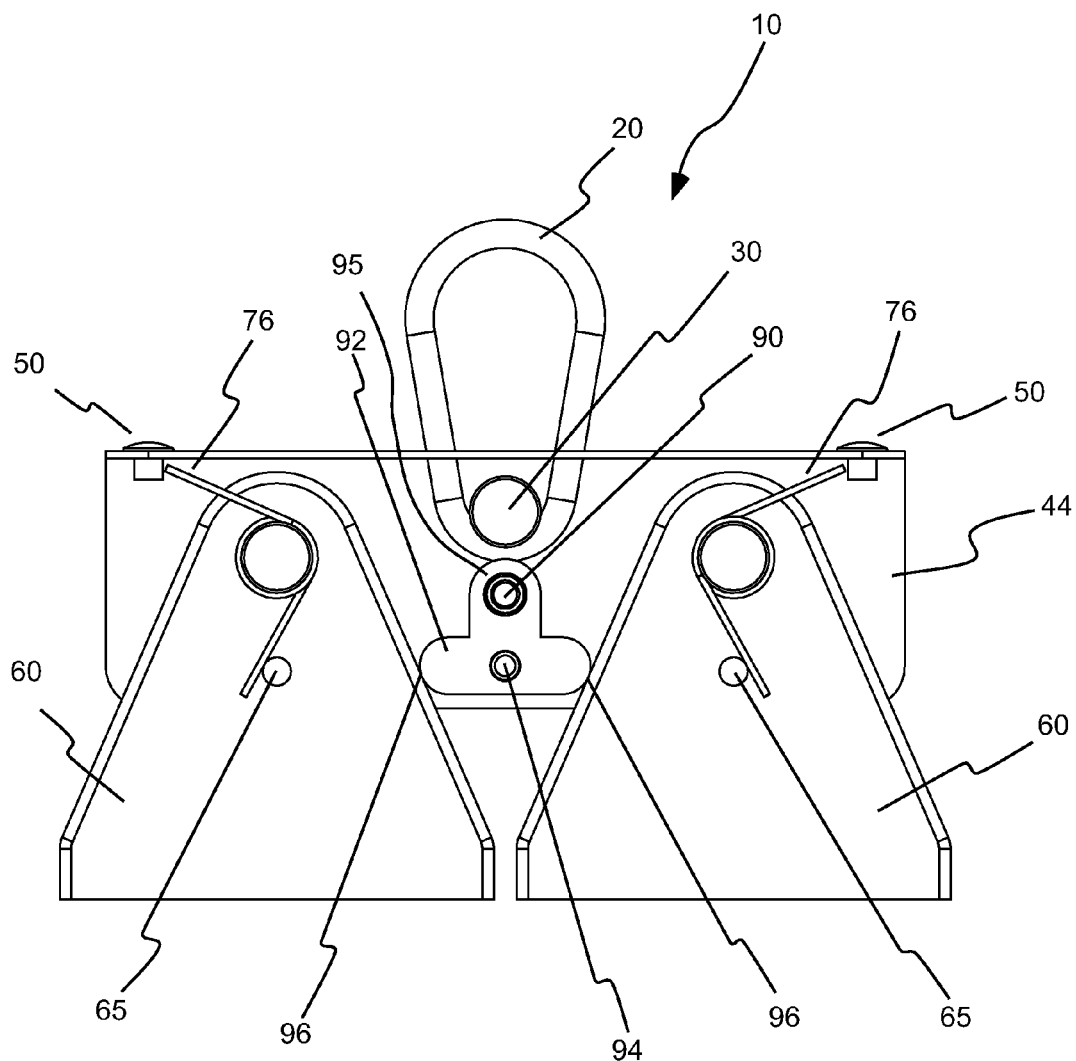
FIG. 5 illustrates a front view of the retractable lifeline support system of FIG. 1 with the front frame thereof removed.

FIG. 5 shows a front view of support 10 with front frame member 42 removed. As illustrated in FIG. 5, in several embodiments, torsion springs 76 were installed around long collars 74 (see also FIG. 3B) with one leg of torsion spring 76 braced against stud 65 of seating 60 and the other leg braced against frame 40. The force from torsion springs 76 tends to make each of seatings 60 bear against a generally centrally positioned abutment element or spacer 92 at lateral edges 96 of spacer 92. A connector 94 provides support for spacer 92 and forms a supporting connection between front and rear frame members 42 and 44 (see, for example, FIGS. 2 and 3B).

Figure 6:
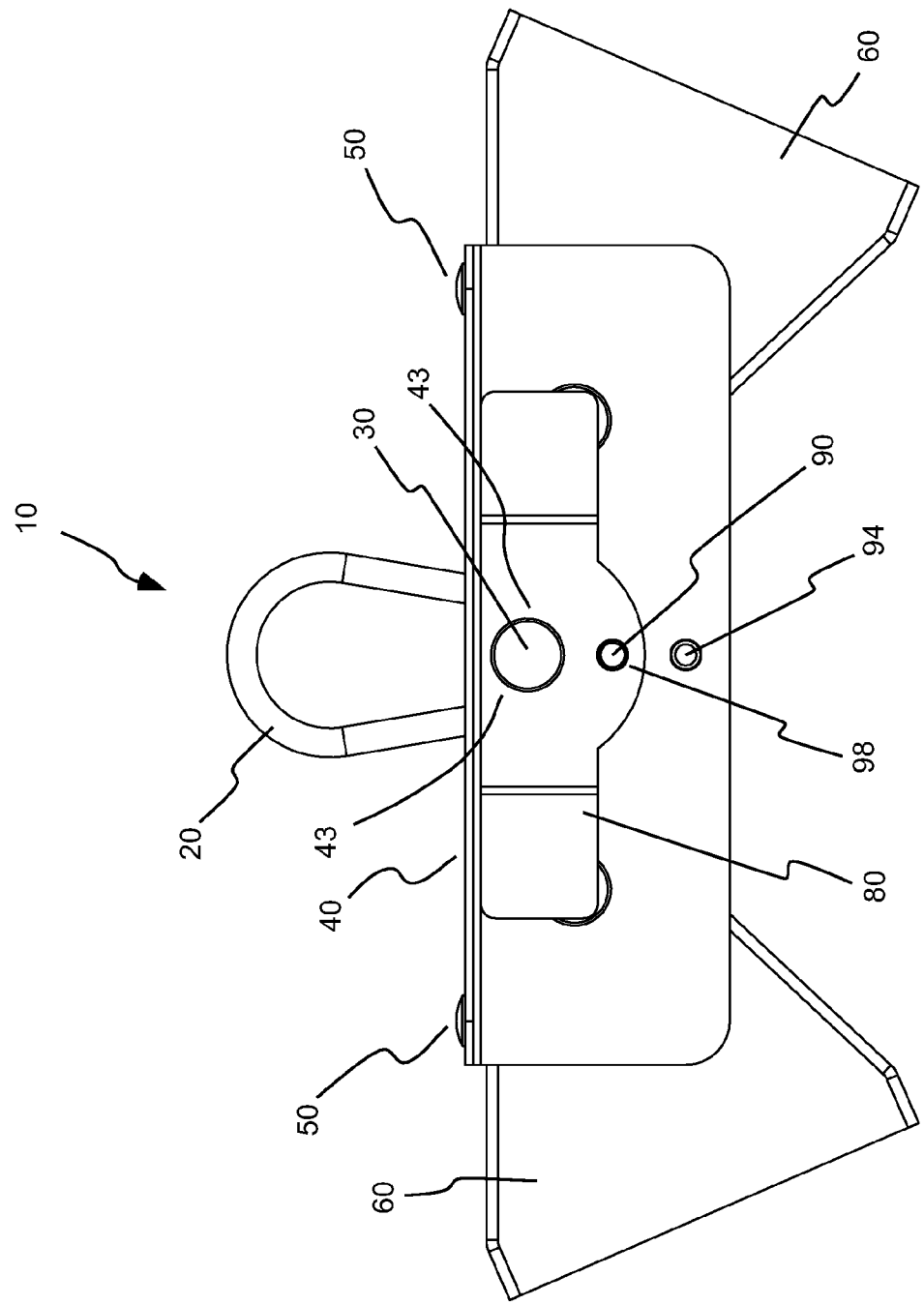
FIG. 6 illustrates a front view of the retractable lifeline support system of FIG. 1 with both retractable lifeline seating rotated out to the sides.

In FIG. 6, force has been applied to both seatings 60 to pivot, rotate or swing seatings 60 out to the lateral sides of system 10. Seatings 60 can swing, rotate or pivot independently of one another. Once the force is removed from seatings 60, seatings 60 return to the position illustrated in FIG. 5 at least in part because of the biasing force of springs 76.

Figure 3B:
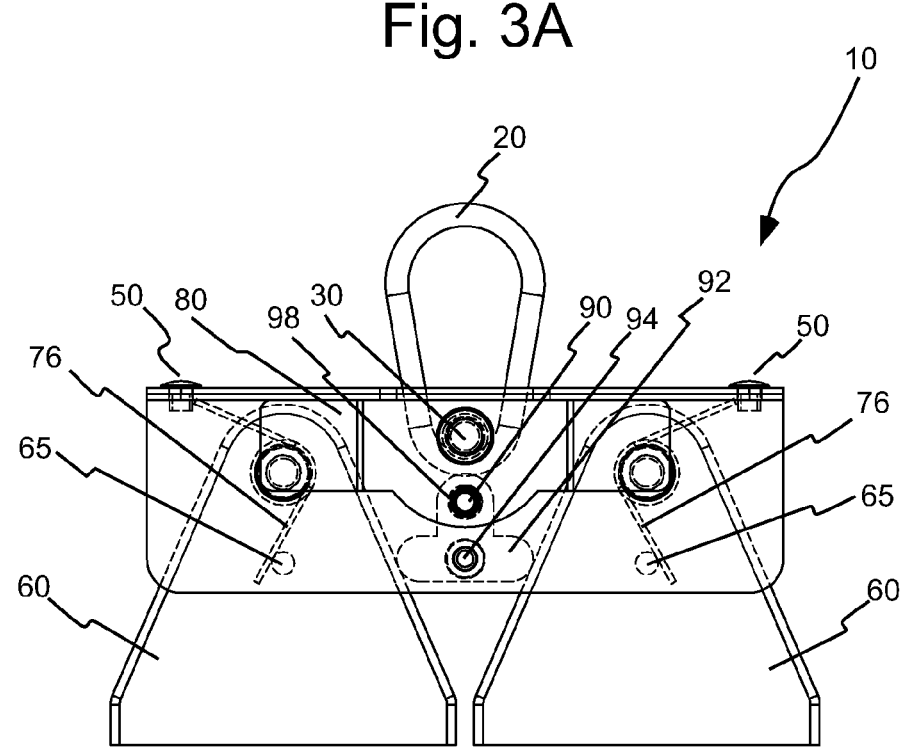
FIG. 3B illustrates a front hidden line view of the retractable lifeline support system of FIG. 1.
Figure 3C:
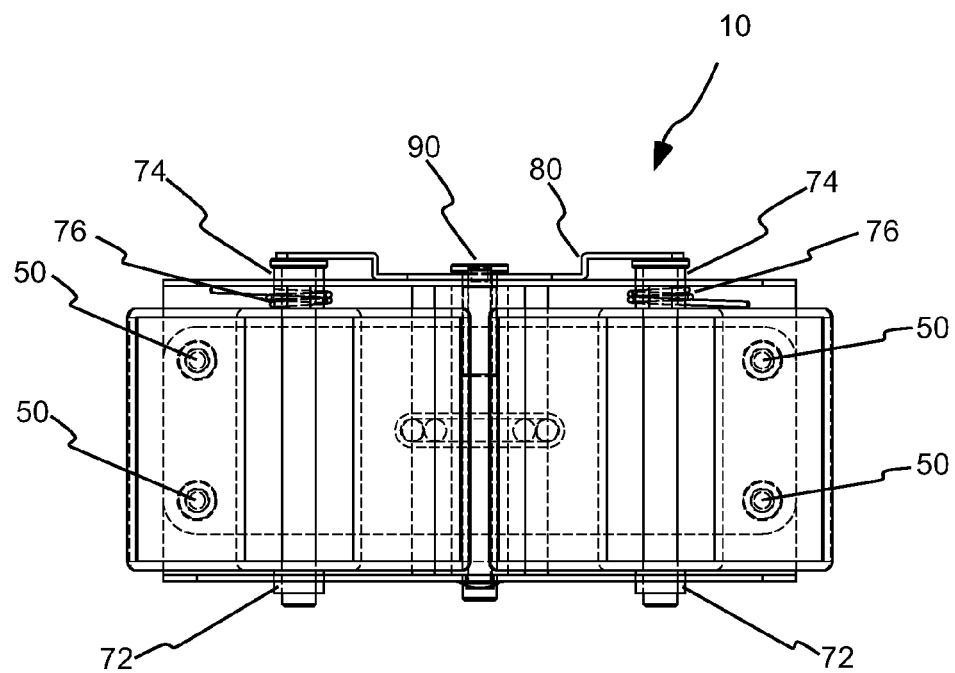
FIG. 3C illustrates a bottom hidden line view of the retractable lifeline support system of FIG. 1.
Figure 3D:
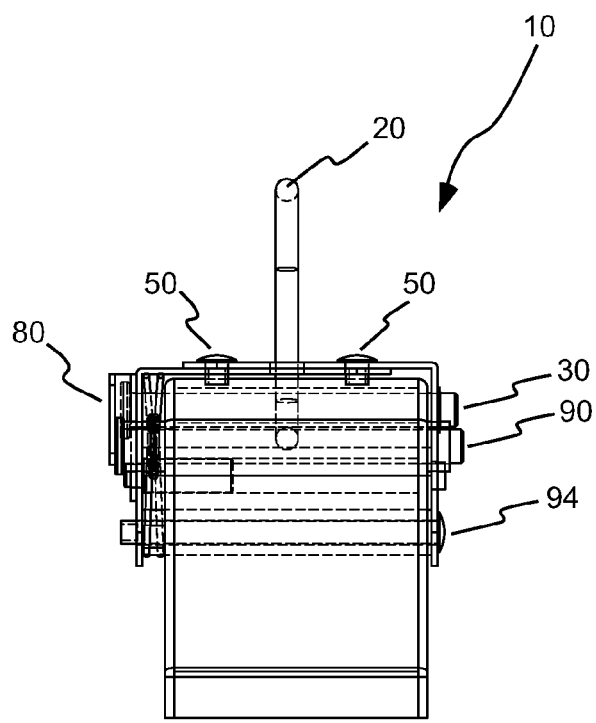
FIG. 3D illustrates a side hidden line view of the retractable lifeline support system of FIG. 1.

As also seen in FIGS. 3B and 5, a retainer 90 slides in a blind hole or passage 95 in spacer 92. In several embodiments, a coil spring (not shown) in hole 95 tends to force or bias retainer 90 out of hole 95. The end of retainer 90 has a reduced diameter which just fits through a hole 98 in a retainer element or pin retainer 80 as seen, for example, in FIG. 3B and FIG. 6. When retainer 90 is extended, pin retainer 80 is held in a first position shown in FIGS. 1-3. When retainer 90 is depressed, pin retainer 80 is free to pivot in either direction about pivot pin 30 as shown in FIG. 7.

In FIG. 7, a self-retracting lifeline 300 is shown prior to being seated into seating 60 of the support system 10. The self-retracting lifeline 300 contains a single self-retracting lifeline 320. Lifeline 320 can, for example, be formed of a webbing material as known in the art. A connector such as a snap hook 350 (see FIG. 8) can be attached at the end or webbing 320. In FIG. 7, only a short portion of webbing 320 is shown extending from self-retracting lifeline 300. Self-retracting lifeline 300 includes an attachment member or connector including a loop or passage 310 on a top end thereof for connecting with one of seatings 60 via seating pin 70. In FIG. 7, retainer 90 has been depressed, and pin retainer 80 has been pivoted to one side to be in a second position, allowing one of seating pins 70 to be withdrawn. The other seating pin 70 is still retained by pin retainer 80. Upon removal of seating pin 70, self-retracting lifeline 300 can be inserted into seating 60 and seating pin 70 can be reinserted so that it passes through attachment loop 310 of the self-retracting lifeline 300. A second self-retracting lifeline can be attached in a similar by pivoting pin retainer 80 to the other side to be in a third position. After the second self-retracting lifeline is attached, pin retainer 80 can then be pivoted back until the retainer 90 snaps back into its extended position within hole 98, thereby locking pin retainer 80 in place (in the first position thereof) and preventing pivoting thereof. Each self-retracting lifeline 300 can be removed by reversing these steps. Operatively connecting retainer 80 to frame 40 enables retention of pins 70 without the use of removable retention elements such as cotter pins and the like, which can be easily dropped, misplaced and/or lost upon removal.

FIG. 8 is a front cutaway view showing system 10 after two self-retracting lifelines 300 have been installed. In the illustrated embodiment, seatings 60 fit closely around self-retracting lifelines 300 and seating pins 70 securely retain self-retracting lifelines 300 within seatings 60 and frame 40. In the illustrated embodiment, rotation of self-retracting lifelines 300 about their long or longitudinal axes is limited by close fitting seatings 60. However, self-retracting lifelines 300 are still able to independently swing, rotate or pivot laterally as illustrated, for example, in FIG. 9. In that regard, FIG. 9 is another front cutaway view showing support system 10 with two self-retracting lifelines 300 installed. One of self-retracting lifelines 300 has been rotated, pivoted or swung to the side about the axis defined by seating or attachment pin 70.

FIGS. 10 through 14 illustrate another embodiment of a support system 110 of the present invention for placing multiple self-retracting lifelines 300 (see, for example, FIG. 12) in operative association with a person. As compared to system 10, system 110 is reduced in size and in the number of components, but functions similar to support system 10 as described above. In the illustrated embodiment, two self-retracting lifelines 300 are attachable to support system 110. Support system 110 includes a connector 120. Connector 120 can, for example, be connected to a D-ring 410 safety harness 400, via an intervening connector such as a carabiner or snap hook.

Connector 120 can alternatively be directly and removably connected to a safety harness attachment member such as D-ring 410 or to straps of a safety harness. For example, connector 120 can be held to a rigid member such as frame 140 by a member such as a pin 122 (see FIGS. 10A and 10B), which cooperates with passages 124 formed in connector 120 and passage formed in flanges 146a and 146b extending from frame 140 to attach connector 120 to frame 140. One end of pin 122 can, for example, be releasably retained by a locking member such as cotter pin (not shown) which passes through a passage or hole 125.

Frame 140 can, for example, be formed generally into a U-shape arrangement. Frame 140 can, for example, be formed integrally from a single piece of metal or can be formed by welding of two or more pieces of metal. A pivot pin 130 passes through a passage 144 in frame member 140 and permits a retainer element or pin retainer 180 to freely pivot in either direction about pivot pin 130.

Figure 10A:
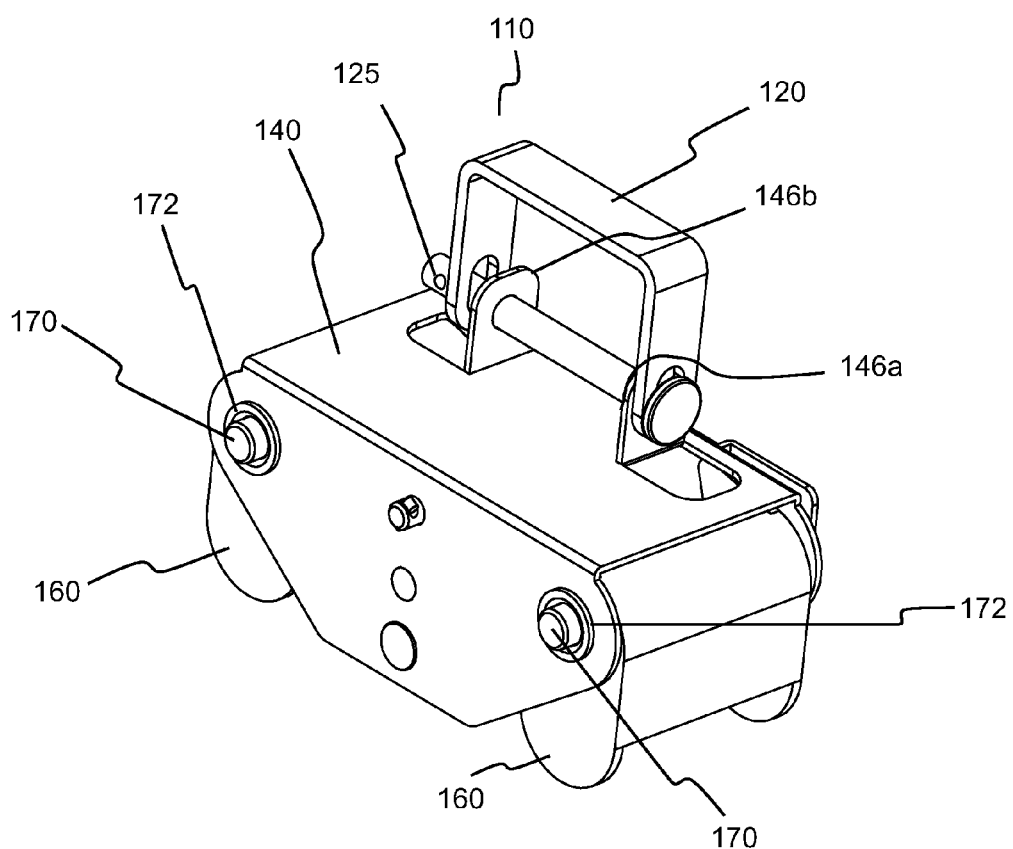
FIG. 10A illustrates a rear perspective view of another embodiment of a retractable lifeline support system of the present invention.
Figure 10B:
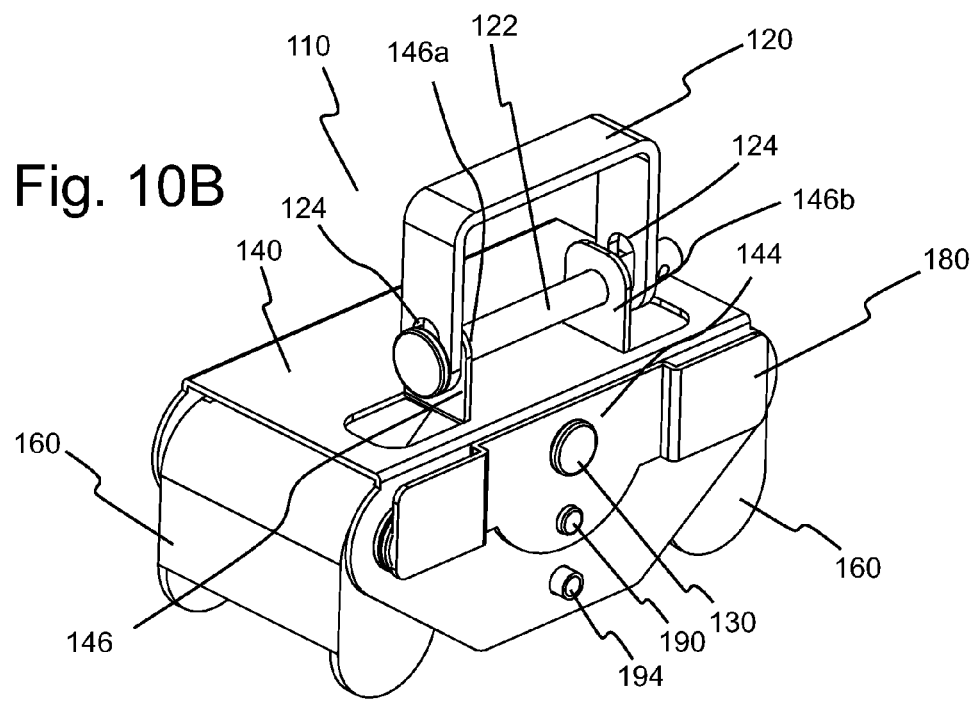
FIG. 10B illustrates a rear perspective view of the retractable lifeline support system of FIG. 10A.
Figure 11A:
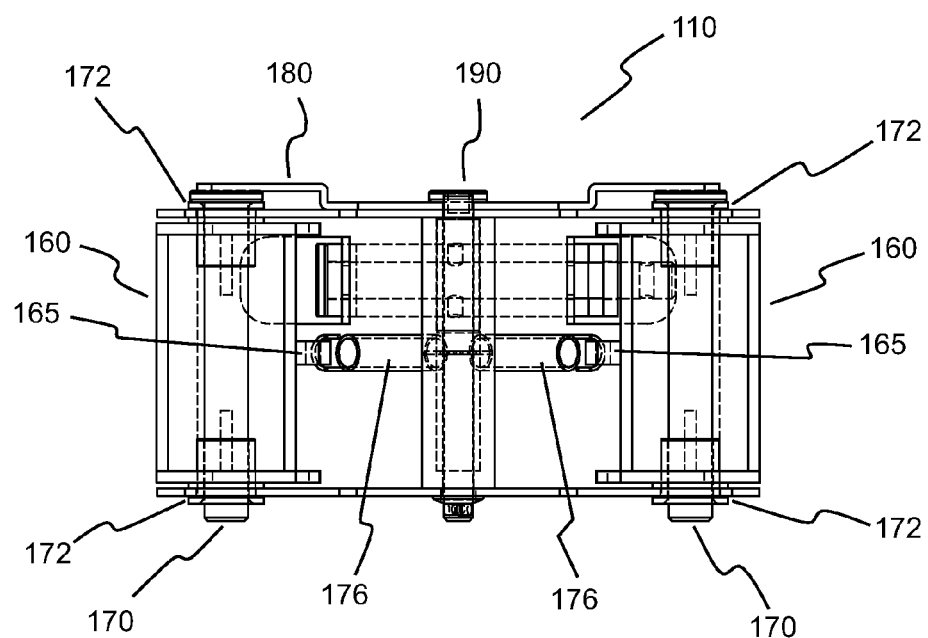
FIG. 11A illustrates a top hidden line view of the retractable lifeline support system of FIG. 10A.
Figure 11B:
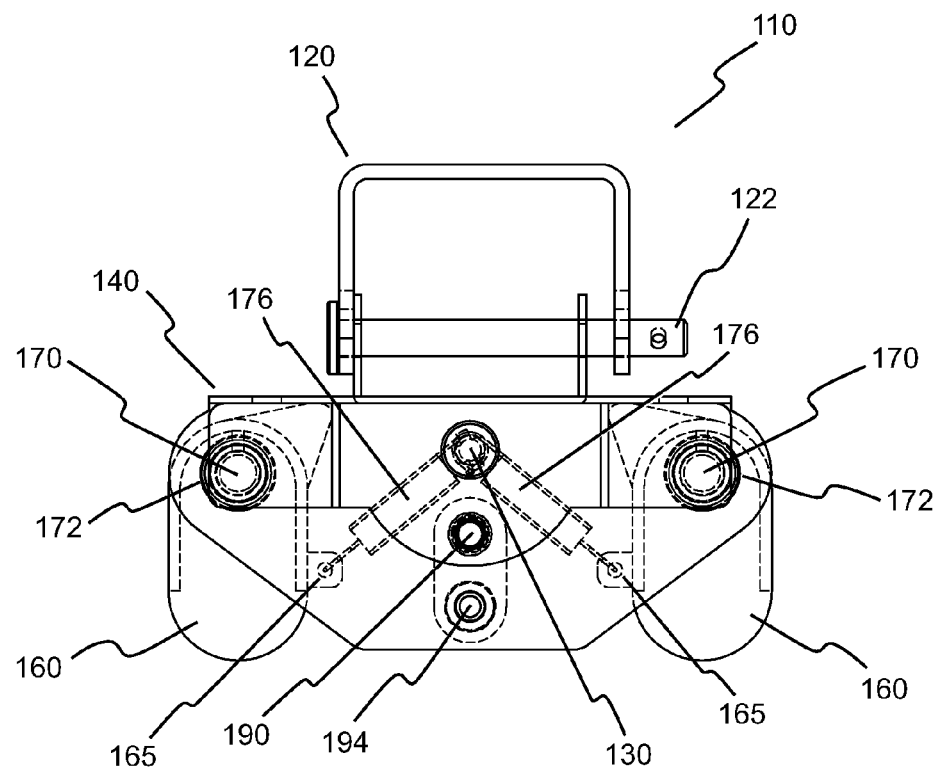
FIG. 11B illustrates a front hidden line view of the retractable lifeline support system of FIG. 10A.
Figure 11C:
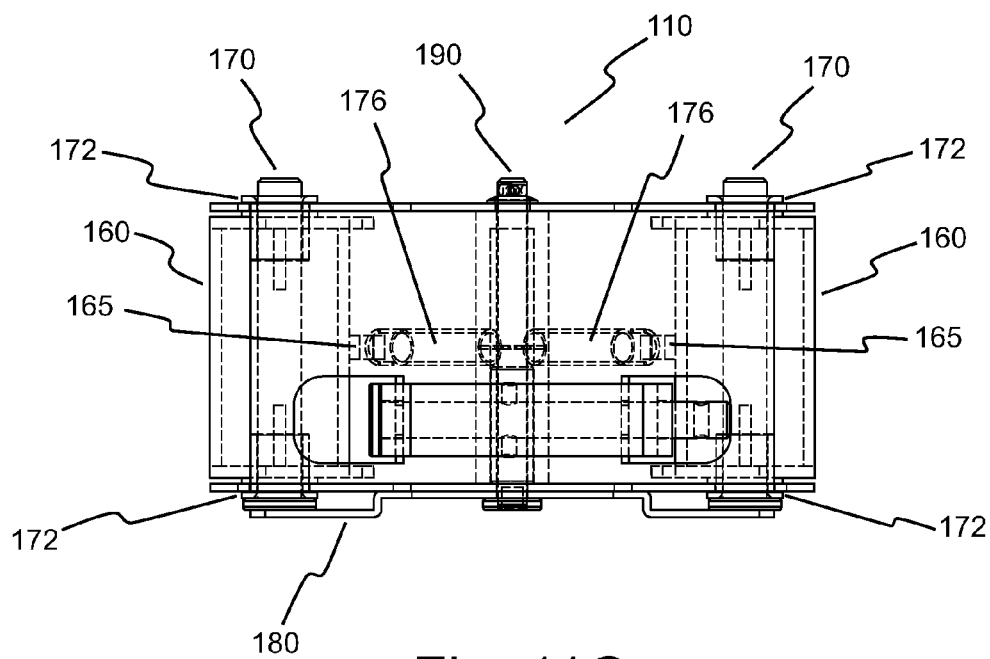
FIG. 11C illustrates a bottom hidden line view of the retractable lifeline support system of FIG. 10A.
Figure 11D:
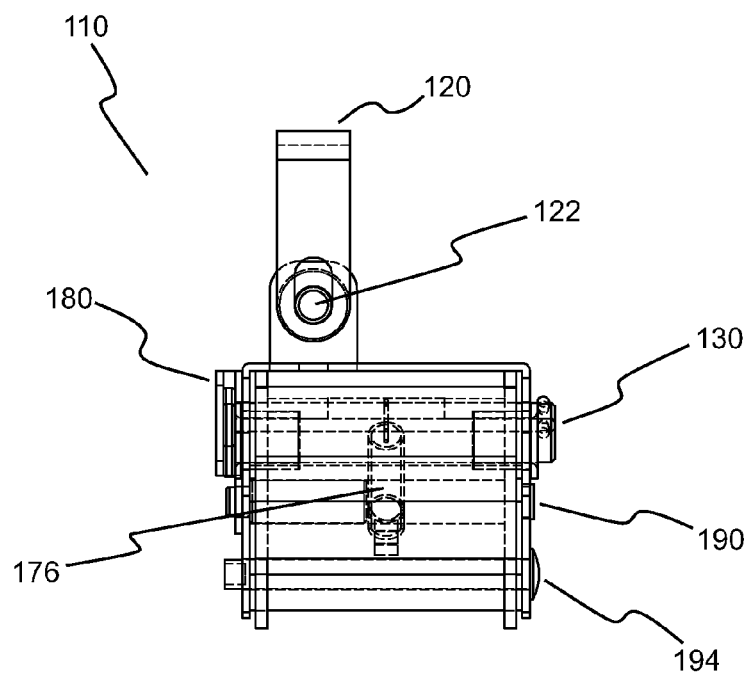
FIG. 11D illustrates a side hidden line view of the retractable lifeline support system of FIG. 10A.

Retractable lifeline seatings 160 are retained in rotatable or pivotable connection with frame 140 via extending members such as seating pins or rods 170 (see, for example, FIGS. 10A and 11B). As, for example, illustrated in the hidden line views of support system 110 in FIGS. 11A-11C, bushings 172 can extend from the front and rear faces of frame member 140. Seating pins 170 can be slidably inserted into frame member 140 via bushings 172. When assembled, bushings 172 pass through passages or holes in frame member 140. Seatings 160, which are smaller in size than seatings 60 of the embodiment of FIGS. 1 through 9, are retained within frame 140 by bushings 172 which are pressed into seatings 160 at the time of assembly. Seating pins 170 pass through bushings 172 to retain the self-retracting lifelines 300 within seatings 160. Seatings 160 pivot on respective seating pins 170 and bushings 172 relative to the frame 140 (see, for example, FIG. 14).

In several embodiments of support system 110, torsion springs 76 of support system 10 were replaced by extension springs 176 (see, for example, FIGS. 11A-11D). Extension springs 176 were installed with one end connected to pivot pin 130 (see, for example, FIGS. 11B and 11C) and the other end connected to an attachment member 165 of seatings 160.

Figure 13:
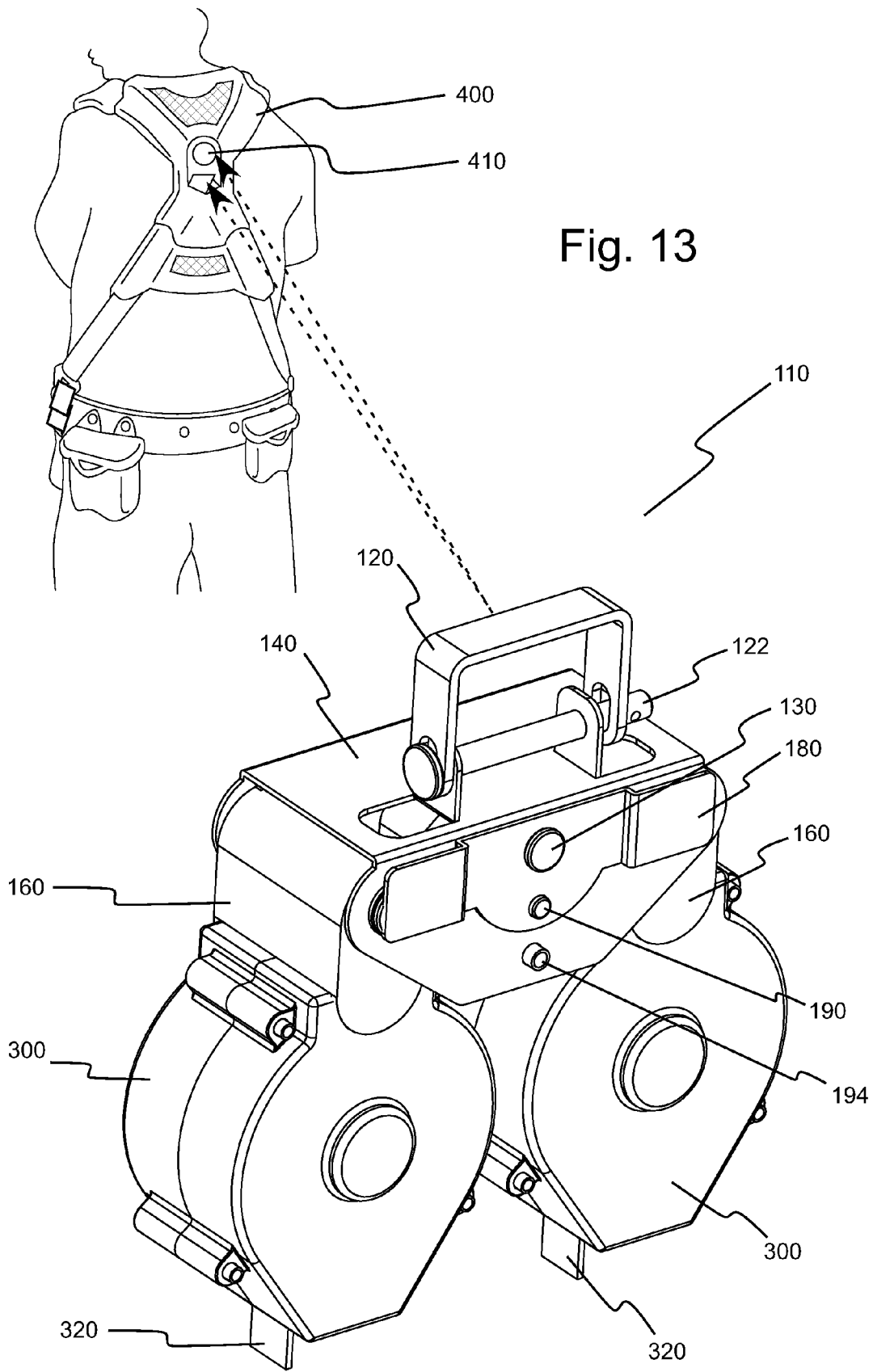
FIG. 13 illustrates a front perspective view of the retractable lifeline support system of FIG. 10A wherein two self-retracting lifelines have been installed therein.

In FIG. 12, a retainer 190 (similar in operation to retainer 90; and hidden from view in FIG. 12 by pin retainer 180; see FIG. 13) has been depressed, and pin retainer 180 has been pivoted to one side, allowing one seating pin 170 to be withdrawn. Pin retainer 180 continues to abut the other seating pin 170, which remains installed. At this point, self-retracting lifeline 300 can be inserted into seating 160 and seating pin 170 can be re-inserted so that it passes through attachment loop 310 of self-retracting lifeline 300. Pin retainer 180 is then pivoted back until retainer 190 snaps back into its extended position and locks within hole 198 formed within pin retainer 180, thereby locking pin retainer 180 against pivoting. Self-retracting lifeline 300 can be removed by reversing the steps described above.

Figure 14:
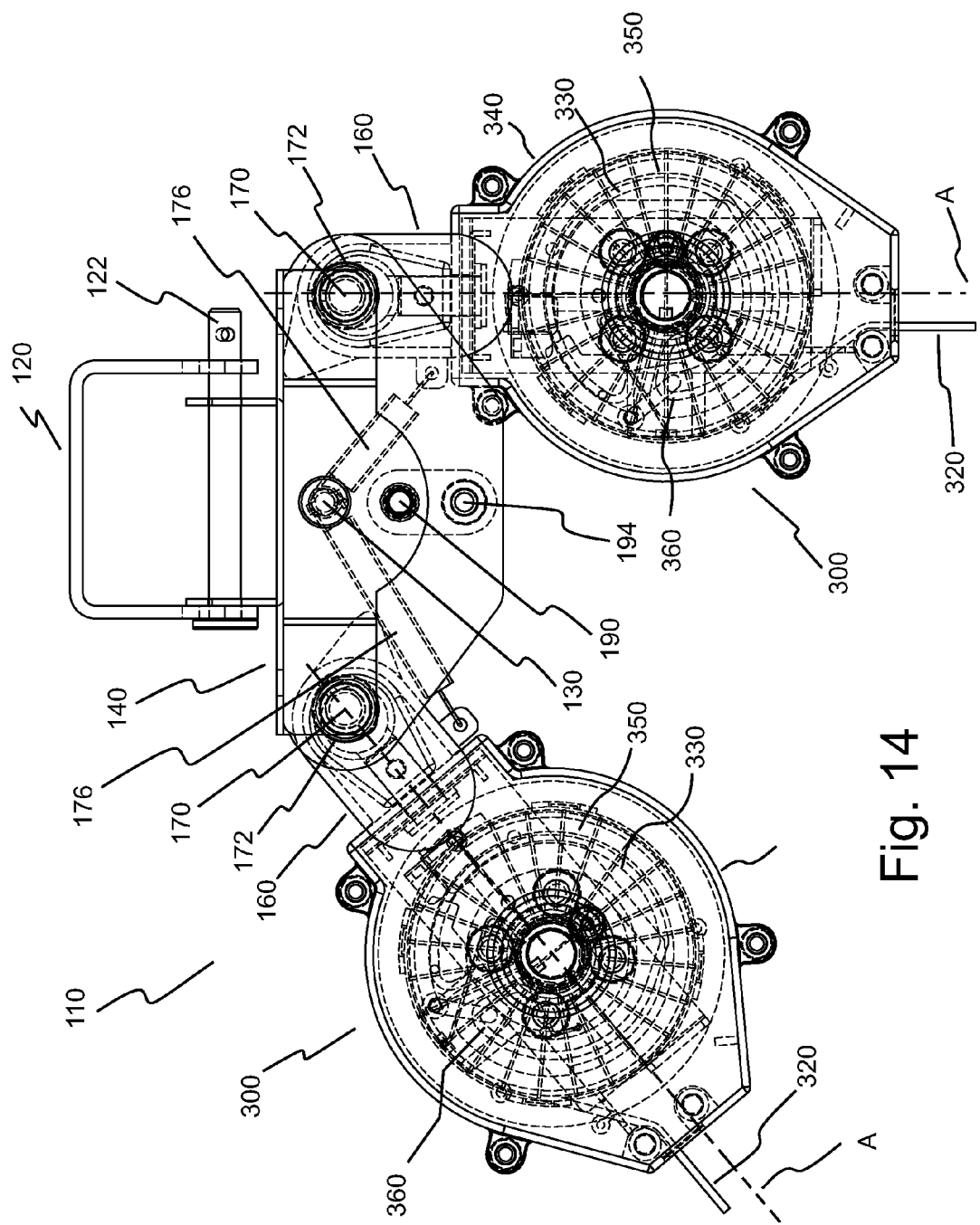
FIG. 14 is a front hidden line view of the retractable lifeline support system of FIG. 10A wherein one of the installed two self-retracting lifelines has been pivoted, rotated or swung to the side.

FIG. 14 shows a hidden line view of one of the seatings 160 swung out to the side. Either of seatings 160 can be swung independently of one another. Upon release of force thereon, self-retracting lifelines 300 are biased by springs 176 to return to the position illustrated in FIG. 13.

Self-retracting lifelines 310 include a drum or spool 330 around which lifeline 320 is spooled. Drum 330 rotates within housing 340. As known in the art, drum 330 can be maintained under adequate rotational tension (for example, via a power spring 350 comprising coiled spring steel) to reel up excess extended lifeline 320 without hindering the mobility of the user. A braking mechanism 360 is placed in operative connection with drum 330. Self-retracting lifelines suitable for use in the present invention are, for example, disclosed in copending PCT International Patent Application No. PCT/US09/35034, entitled Self-Retracting Lifeline Systems and Braking Systems Therefor, filed Feb. 24, 2009 and PCT International Patent Application No. PCT/US09/34981, entitled Energy Absorbing Lifeline Systems, filed Feb. 24, 2009, the disclosures of which are incorporated herein by reference. Other self-retracting lifelines suitable for use in connection with the present invention are, for example, disclosed in U.S. Pat. No. 5,771,993. Further examples of self-retracting lifelines suitable for use in connection with the present invention are, for example, available from Sperian Fall Protection, Inc. under the product trademarks SCORPION® Personal Fall Limiters, BLACK RHINO® Self-Retracting Lifelines, MINI-LITE® Fall Limiters, FALCON® Self-Retracting Lifelines, and MIGHTYLITE® Self-Retracting Lifelines. In general, support systems 10 and 110 can be used with generally any self-retracting lifeline system.

As illustrated in FIG. 14, self-retracting lifelines 300 (or at least housings 340 thereof) are readily pivotable or rotatable generally within the plane of drum 330 (or about the axis of pins, shafts or rods 170). Rotation about the long or longitudinal axis A (see left side of FIG. 14) of self-retracting lifeline 300/housing 340 is limited in the illustrated embodiment, but rotation about axis A can readily be provided as discussed further below.

As clear to one skilled in the art in light of the present disclosure, pins, shafts or rod 170 (or pins or rods 70) can be maintained in connection with frame 140 (or frame 140) via any number of means known in the connector arts. For example, such pins, shafts or rods can be formed to have a head or shoulder larger in diameter of the shaft of the pin on one end and include a connector mechanism (for example, threading to cooperate with a nut or a passage to cooperated with a cotter pin) to removably retain the pin in operative connection with the frame. Alternatively, pins, shafts or rods similar to pins, shafts or rods 170 or 70 can be nonremovably connected within the frame and the self-retracting lifelines can be removably connectable thereto via, for example, a connection similar to a snap hook or carabiner.

Figure 15:
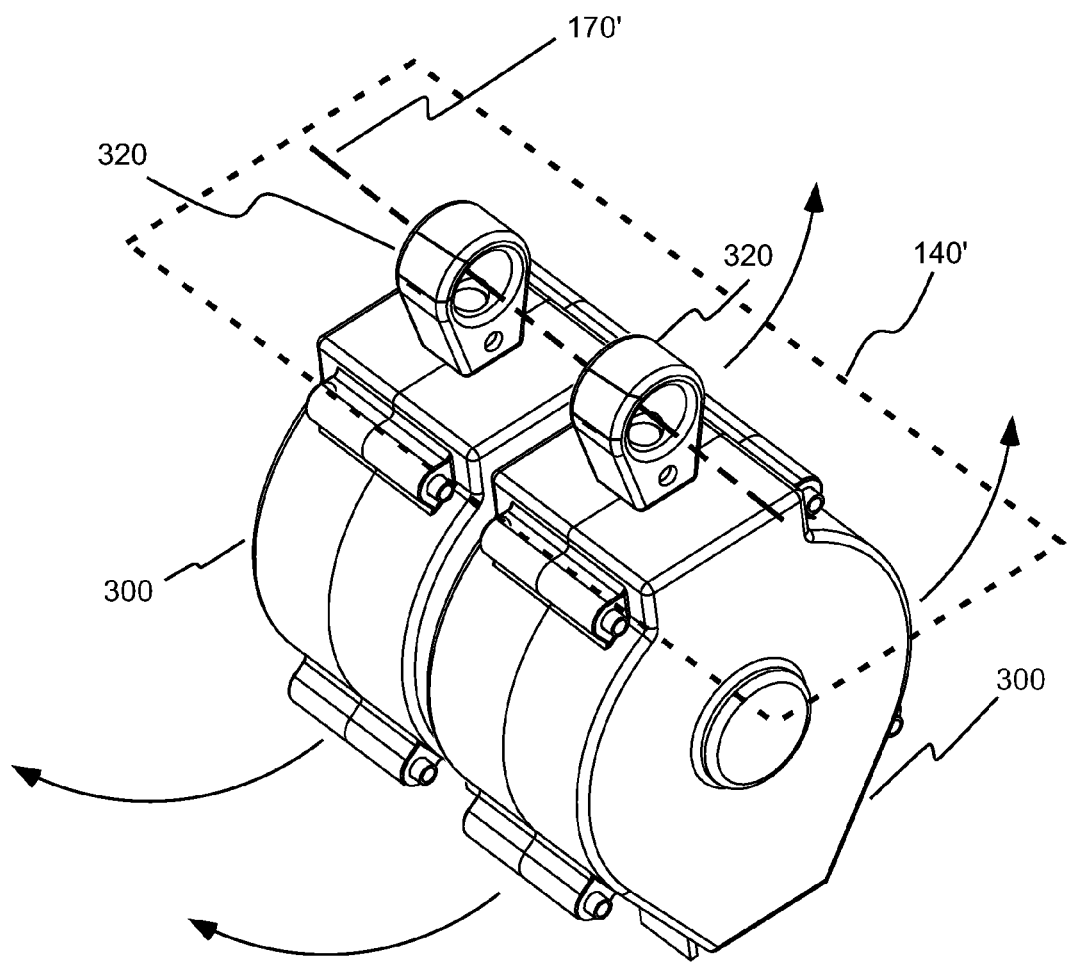
FIG. 15 illustrates a perspective, partially schematic view of another embodiment of a lifeline support systems of the present invention in which two self-retracting lifeline are independently movably (for example, pivotably or rotatably) attached to the support system in a front-to-back arrangement.

Moreover, as illustrated in FIG. 15, self-retracting lifelines 300 of the present invention can be independently rotatably or pivotably attached to a rigid support member 140' (illustrated schematically in FIG. 15) in a front-to-back, rather than a side-to-side orientation. In FIG. 15, self-retracting lifelines 300 can, for example, be attached to one or more pins or rods via a connector 320. Such a pin or pins can, for example, be oriented along a common axis and are represented in FIG. 15 by axis 170'. As described above pin(s) 170 can be removable to attached self-retracting lifeline 300, an intervening connector such as a snap hook or a carabiner can be used to connect self-retracting lifelines to pin(s) 170 or connector 320 can be openable (for example, in the manner of a snap hook or a carabiner) to connect self-retracting lifelines 300 to pin(s) 170.

FIGS. 16A through 16E illustrate another embodiment of a support system 110a of the present invention for placing multiple self-retracting lifelines 300a (see, for example, FIG. 12) in operative association with a person. System 110a is similar in operation to system 110 and corresponding components of system 110a are designated similarly to like components of system 110 with addition of the designation "a" thereto. Support system 10a includes a connector 120a that can be used to directly attached system 110a to, for example, a D-ring or to safety harness webbing.

Connector 120a includes a generally U-shaped connector member 122a including an extending passage or slot 123a on a first side thereof to operatively connect connector member 122a to a retainer 146a on a safety device such as support system frame 140a. Connector member 122a includes an engagement member such as an extending abutment member or flange 124a on a second end thereof which cooperates with a passage 147a formed in an extending member 148a (see, for example, FIG. 16D and FIG. 21A through 21C) of frame 140a and with a latch mechanism 149a to removably retain the second end of connector member 122a in operative connection with frame 140a.

Figure 16A:
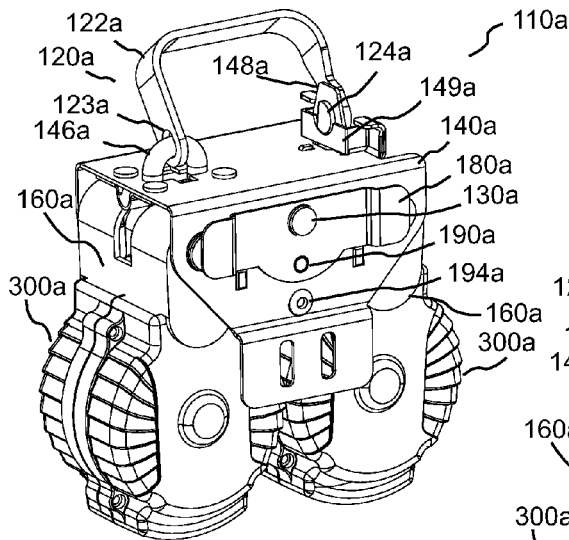
FIG. 16A illustrates a perspective view of another embodiment of a retractable lifeline support system of the present invention having a connector that is operable to connect the support system to, for example, a D-ring or harness strapping without an intervening connector in a first step in a process of opening the connector.
Figure 16B:
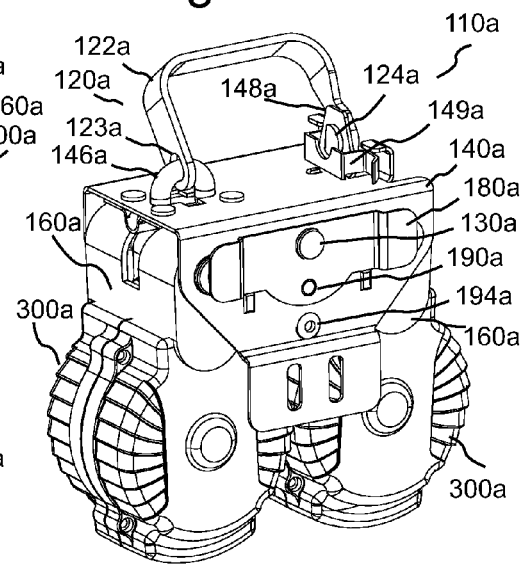
FIG. 16B illustrates another perspective view of the retractable lifeline support system of FIG. 16A in a second step of opening the connector.
Figure 16C:
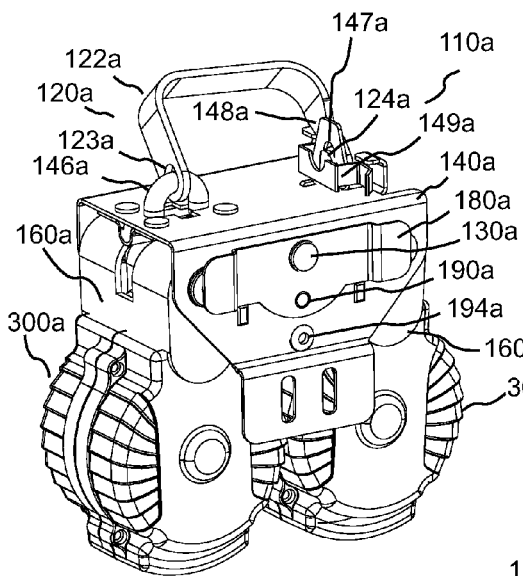
FIG. 16C illustrates another perspective view of the retractable lifeline support system of FIG. 16A in a third step of opening the connector.
Figure 16D:
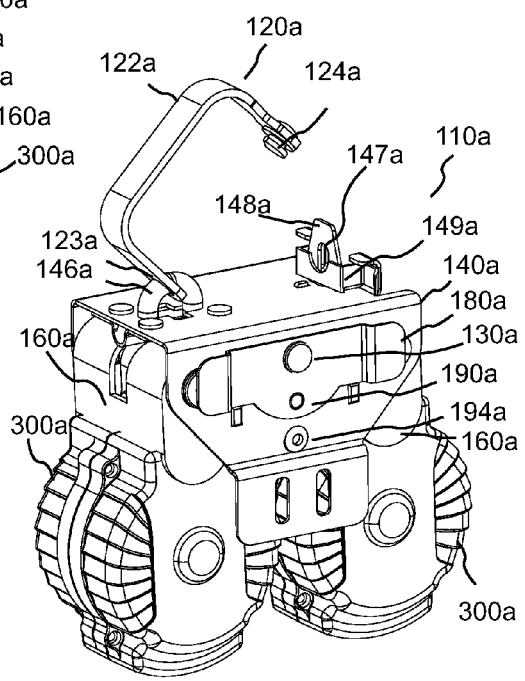
FIG. 16D illustrates another perspective view of the retractable lifeline support system of FIG. 16A in a fourth and final step of opening the connector.
Figure 16E:
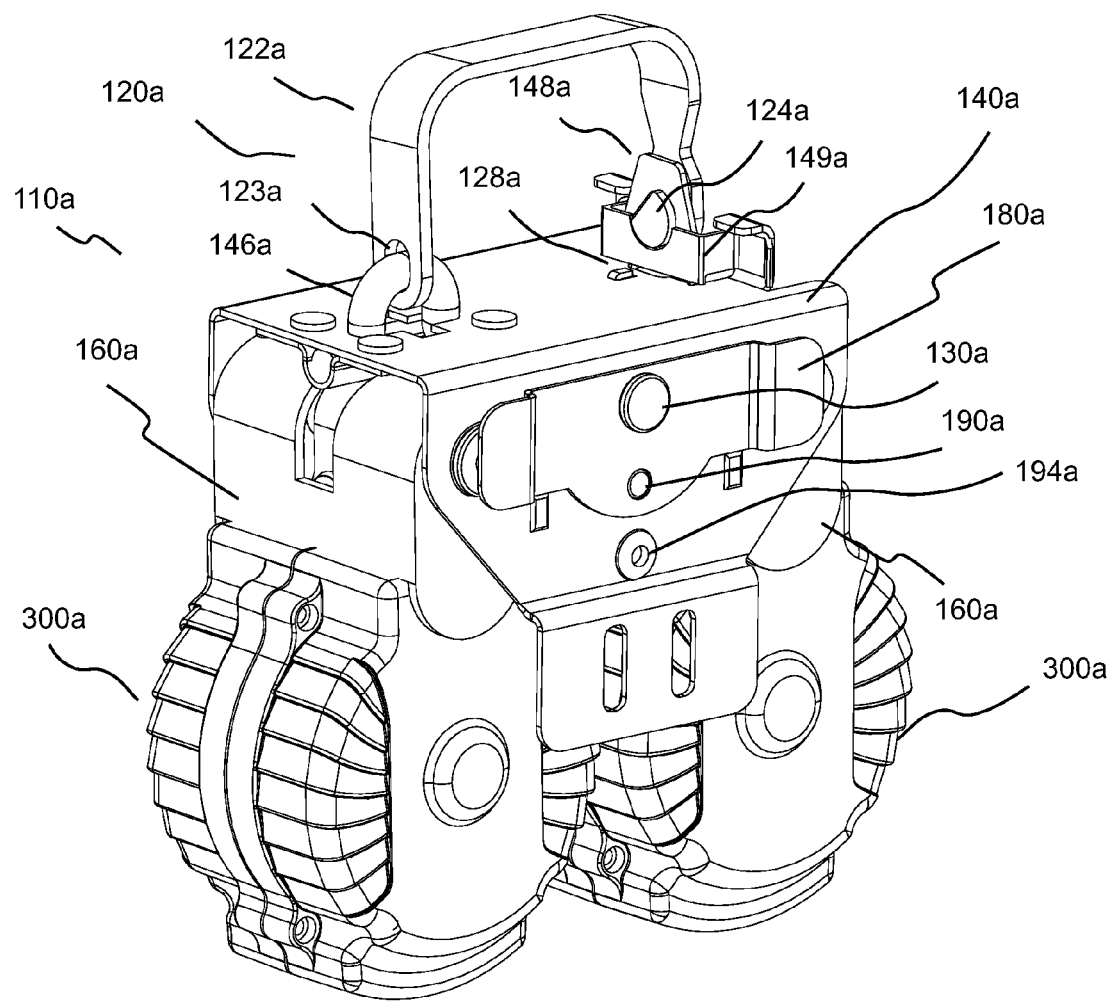
FIG. 16E illustrates another perspective view of the retractable lifeline support system of FIG. 16A wherein the connector is in a fully closed position.

FIG. 16B illustrates latch mechanism 149a in a release or disengage state to allow disconnection of the second end of connector member 122a from extending member 148a. Latch 149a is preferably biased or otherwise maintained in a non-released or engaged state (as, for example, illustrated in FIG. 16E) so that an affirmative action by the user is required to place latch 149a in a released state. In one embodiment, latch mechanism 142a included a length of formed spring steel that a user could deflect out of engagement with abutment member 124a. A stop 128a was provide to limit such deflection. In FIG. 16C, the second end of connector member 122a has been lowered so that abutment member 124a is, for example, brought into alignment with a wider or larger area of passage 147a (see FIGS. 21A through 21C) to enable passage of abutment member 124a (for example, a flange on an end of an extending engagement member) therethrough. As illustrated, abutment member or flange 124a can also be formed non-symmetrically to require a certain orientation thereof to allow disconnection from passage 147a of extending member 148a. FIG. 16D illustrates the second end of connector member 122a in a fully disconnected state wherein the second end has been raised to facilitate connection thereof to, for example, one or more strap members of safety harness 400 (for example, in the vicinity of D-ring 410).

FIGS. 17A through 19B illustrates another embodiment a support system 210 of the present invention for placing multiple self-retracting lifelines 300a (and/or other devices) in operative association with a person. In the illustrated embodiment, two self-retracting lifelines 300*a* are attachable to support system 210. Support system 210 includes a connector 214 including, for example, a rigid member such as a frame 220 (for example, formed from a metal such as stainless steel) and an extending member such as a pin or other element 240 which can be placed in removable or selective operative connection D-ring 410 of harness 400 (see, for example, FIGS. 19A and 19B). In the illustrated embodiment, pin 240 is movably or slidably positioned between a front frame member 220*a* and a rear frame member 220*b* of frame 220.

Frame 220 further includes a space or slot 222 formed in an upper surface 220*c* thereof, which is in communicative connection with the space between front frame member 220*a* and rear frame member 220*b*. As illustrated, for example, in FIGS. 17A and 17B, D-ring 410 can be inserted within slot 222. As illustrated, for example, in FIG. 17F, pin 240 can be passed through the opening in D-ring 410 to retain connector 214 in operative connection with D-ring 410.

In several embodiments, at least two independent actions are required of a user to remove connector 214 from operative connection with D-ring 410. In the illustrated embodiment, one must first rotate an abutment element or catch lever 260 about a pivot element 262 (for example, a rivet) to remove catch lever 260 from abutting contact with a forward end of an attachment element such as a pin, shaft or rod 240. Abutment element 260 can, for example, be rotated approximately 45 degrees to move it out of abutment with attachment element or pin 230 and to allow clearance for attachment pin 240 to slide, move or retract within the space between front frame member 220*a* and rear frame member 220*b* of frame 220. In the illustrated embodiment, attachment pin 240 is movably or slidably retained within a passage or hole 224 formed in forward frame member 220*a* of frame 220. Contact elements such as pins 226 (positioned within passages 228 formed in front frame member 220*a*) extend into passage 224 to cooperate with slots 244 formed along a portion of the length of attachment pin 240. Cooperation of pins 226 with slots 244 prevents attachment pin 240 from being removed from operative connection with frame member 240 and prevents rotation of attachment pin 240 relative to (and between) front frame member 220*a* and rear frame member 220*b*, while allowing attachment pin 240 to slide between front frame member 220*a* and rear frame member 220*b*.

In the illustrated embodiment, attachment pin 240 is formed generally as a cylinder having a generally central passage 246. The inner wall of passage 246 includes threading (not shown) over at least a portion thereof to form a threaded engagement with threading 248 of a rod, shaft or bolt 250. Bolt 250 passes through a passage or hole 230 formed in front frame member 220*b* to enter the space between front frame member 220*a* and rear frame member 220*b* and engage attachment pin 240. A grasping member, such as a knurled knob 252, can be provided to facilitate grasping and rotation of bolt 250. In that regard, after moving catch lever 260 out of contact with attachment pin 240, knob 252 is rotated (for example, counterclockwise) until threading 248 of bolt 250 disengages cooperating threading of attachment pin 240 and attachment pin 240 is free to move independently of bolt 250. At this point, attachment pin 240 can be slid forward (for example, under the force of gravity upon tilting of connector 214) until it is suitably clear of connection with D-Ring 410 so that D-ring 410 can be removed from slot 222.

The process described above for removal of D-ring 410 is reversed to connect D-ring 410 to connector 214. In that regard, D-Ring 410 in inserted into slot 222 until D-Ring moves past or clear of attachment pin 240. Attachment pin 240 is then slid rearward to pass through the center hole in D-Ring 410. While holding attachment pin 240 to both maintain its position through the center hole of D-Ring 410 and abut bolt 250, knob 252 is rotated (for example, clockwise) so that threading 248 engages the threading in passage 246 of attachment pin 240. Upon hand tightening, attachment pin 240 is fully engaged. After engaging attachment pin 240, catch lever 260 is rotated into engagement with attachment pin 240. In several embodiments, the distal end of catch lever 260 includes a U-shaped bracket 264 that contact frame 220 to provided an indication to the user that catch lever 260 is in the engaged position. Bracket 264 can be dimensioned so that the legs thereof must be forced outward to engage frame 220, thereby reducing the likelihood that catch lever will be accidentally disengaged from abutting contact with attachment pin 240. A detent element 266 can also be provided to assist in maintaining catch lever in an engaged state. Once catch lever 260 is in abutting contact with attachment pin 240, attachment pin 240 cannot slide forward to a disengaged position.

To attach or remove self retracting lifelines 300*a* (and/or other elements such as safety devices) to connector 214 in the embodiment illustrated in FIGS. 17A through 19B, one first rotates catch lever 260 to allow clearance for attachment pin 240 to retract as described above. Knob 252 is then rotated until attachment pin 240 is disengaged from and free to move independently of bolt or shaft 250. Attachment pin 240 is then slid forward until generally clear of slot 222.

Connector 214 further includes a retainer such as a sliding retainer or bracket 270 that is slidably positioned on frame 220. In the illustrated embodiment, bracket 270 is generally U-shaped including a front member 270*a* and a rear member 270*b* connected over a central portion thereof by a lower member 270*c*. Bracket 270 further includes tabs 272 extending from the top of front member 270*a* and rear member 270*b* thereof to at least partially encompass frame 220. Tabs 272 can include downward extending sections 272*a* that form a detent engagement with seatings or passages to assist in maintaining bracket 270 in a first or detent position as further described below. During assembly, shaft or bolt 250 passes through a passage 274 formed in rear surface 270*b* of bracket 270 before knob 252 is attached thereto. The attachment of shaft or bolt 250 and knob 252 assists in retaining bracket 270 in operative connection with frame 220. As, for example, illustrated in FIG. 17H, passage 230 is elongated so that knob 252, bolt 250 and bracket 270 can be slid relative to frame member 240 over a range of positions (as described further below) limited by the width of passage 230.

Figure 18A:
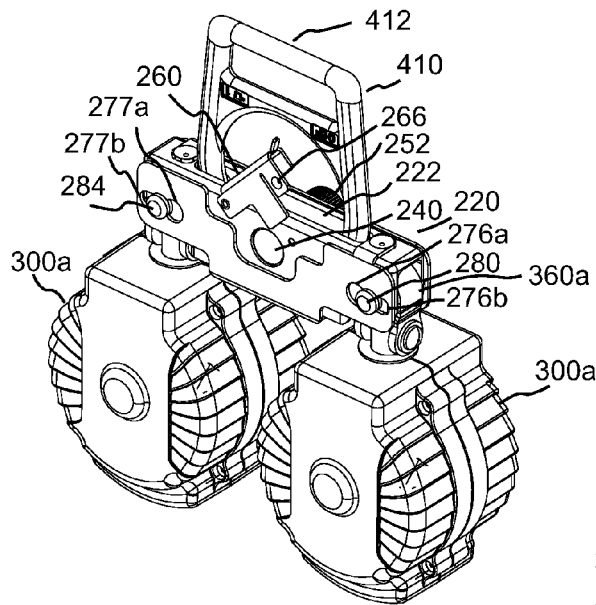
FIG. 18A illustrates the a front perspective view of the connector of the system of FIG. 17A wherein a retainer or an abutment member has been rotated out of abutment with a attachment member of the connector.
Figure 18B:
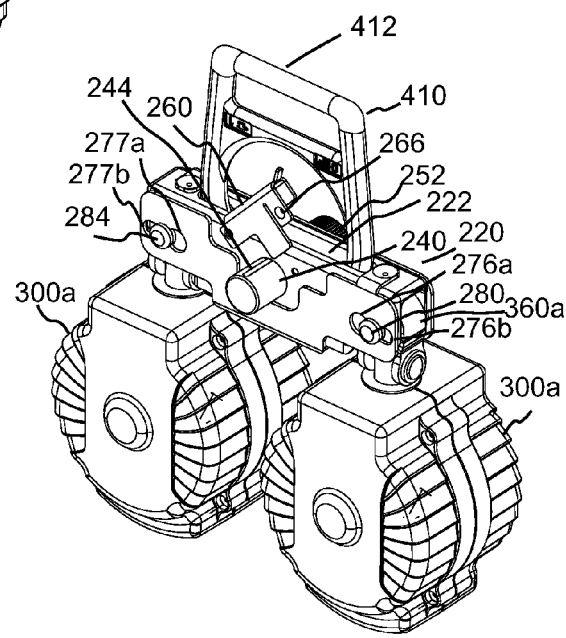
FIG. 18B illustrates a front perspective view of the connector illustrating rotation of a cooperating attachment member so that a threaded portion of the cooperating attachment member moves out of operative connection with the D-ring so that the connector can be removed from connection with the D-ring.
Figure 18C:
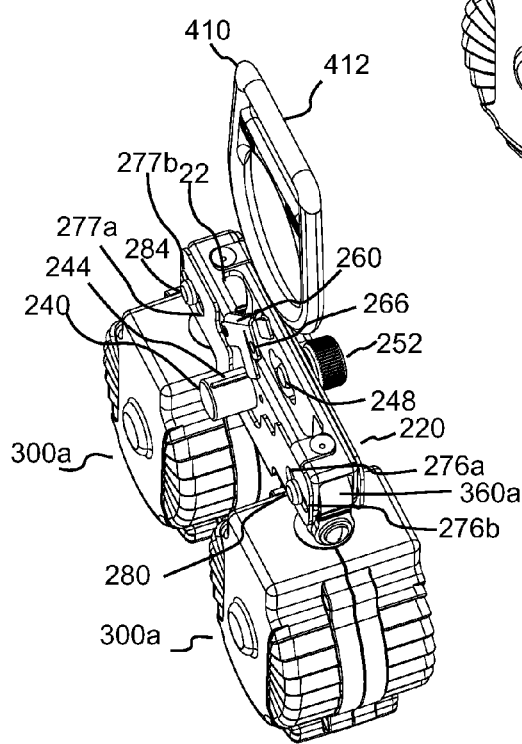
FIG. 18C illustrates a front perspective view of the connector wherein the connector has been disconnected from the D-ring.
Figure 18D:
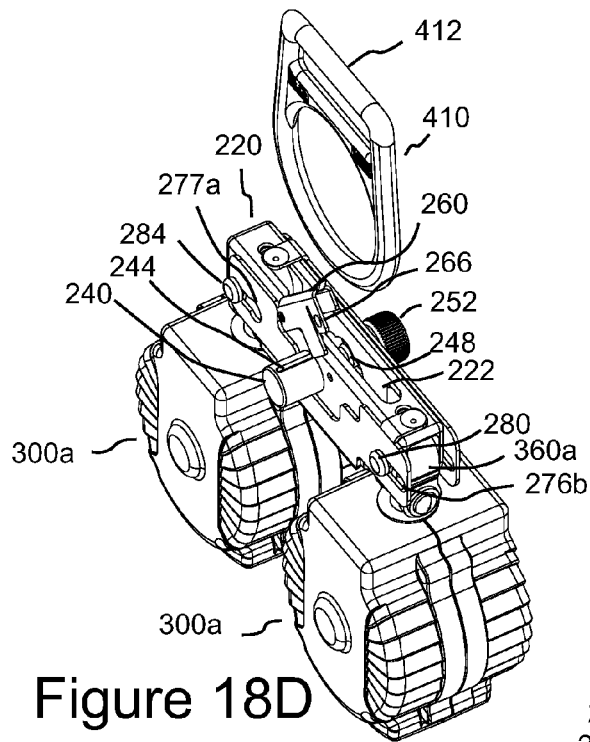
FIG. 18D illustrates a front perspective view of the connector wherein a sliding retainer bracket has been slid to a first side to allow removal of a first attachment or retaining pin and removal of a first self-retracting lifeline from connection with the connector.

Once attachment pin 240 is disengaged form bolt 250 and slid forward to be generally clear of slot 222 (and out of engagement with passage 230 of retainer bracket 270) as described above, bracket 270 can be slid to one side out of the first, detent position and to a second position (for example, to the right as illustrated in FIG. 18D). In that regard, bracket 270 is slid to the right (in the illustrated orientation) until a first device attachment pin or rod 280 is clear to be removed through relatively larger openings 276*a* formed in front surface or member 270*a* and 270*b* of sliding bracket 270. In that regard, openings 276*a* are in communicative connection with slots 276*b* that have a width that is smaller that the width of openings 276*a*. When bracket 270 is in the first or detent position (as, for example, illustrated in FIG. 18C), slots 276*b* of front member 270*a* and rear member 270*b* engage areas of reduce diameter or seatings 282 formed in device attachment pin 280 to retain device attachment pin 280 in operative connection with bracket 270 and frame 220 (via passages 234). Likewise, when bracket 270 is in the first or detent position, slots 277b of front member 270a and rear member 270b engage areas of reduce diameter or seatings 286 formed in a second device attachment pin 284 to retain device attachment pin 284 in operative connection with bracket 270 and frame 220 (via passages 236).

Figures 17A, 17B:
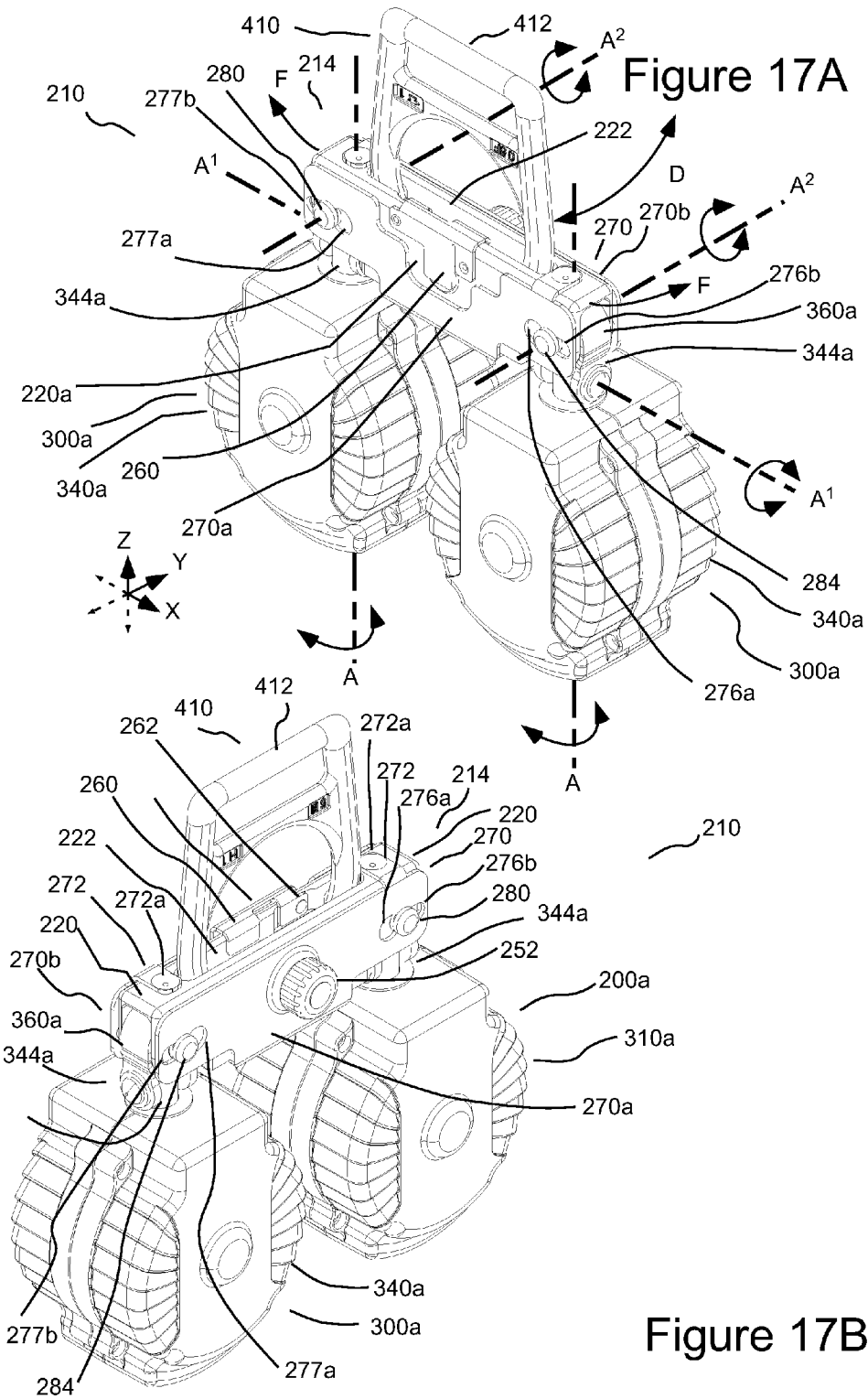
FIG. 17A illustrates a front perspective view of another embodiment of a retractable lifeline support system of the present invention having a connector that is operable to connect the support system to a D-ring.
FIG. 17B illustrates a rear perspective view of the system of FIG. 17A.
Figure 17H:
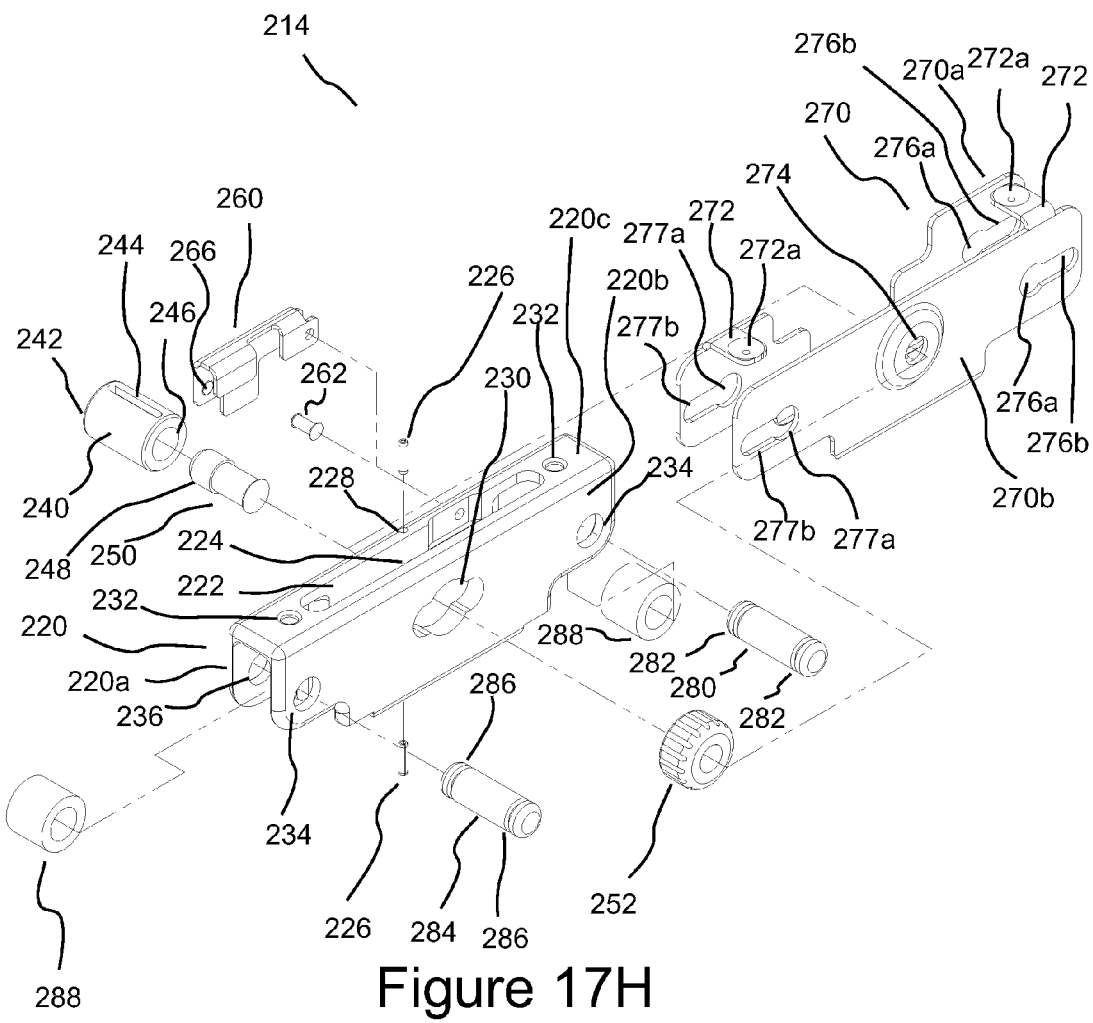
FIG. 17H illustrates a rear, perspective exploded view of the connector of the system of FIG. 17A.
Figure 17I:
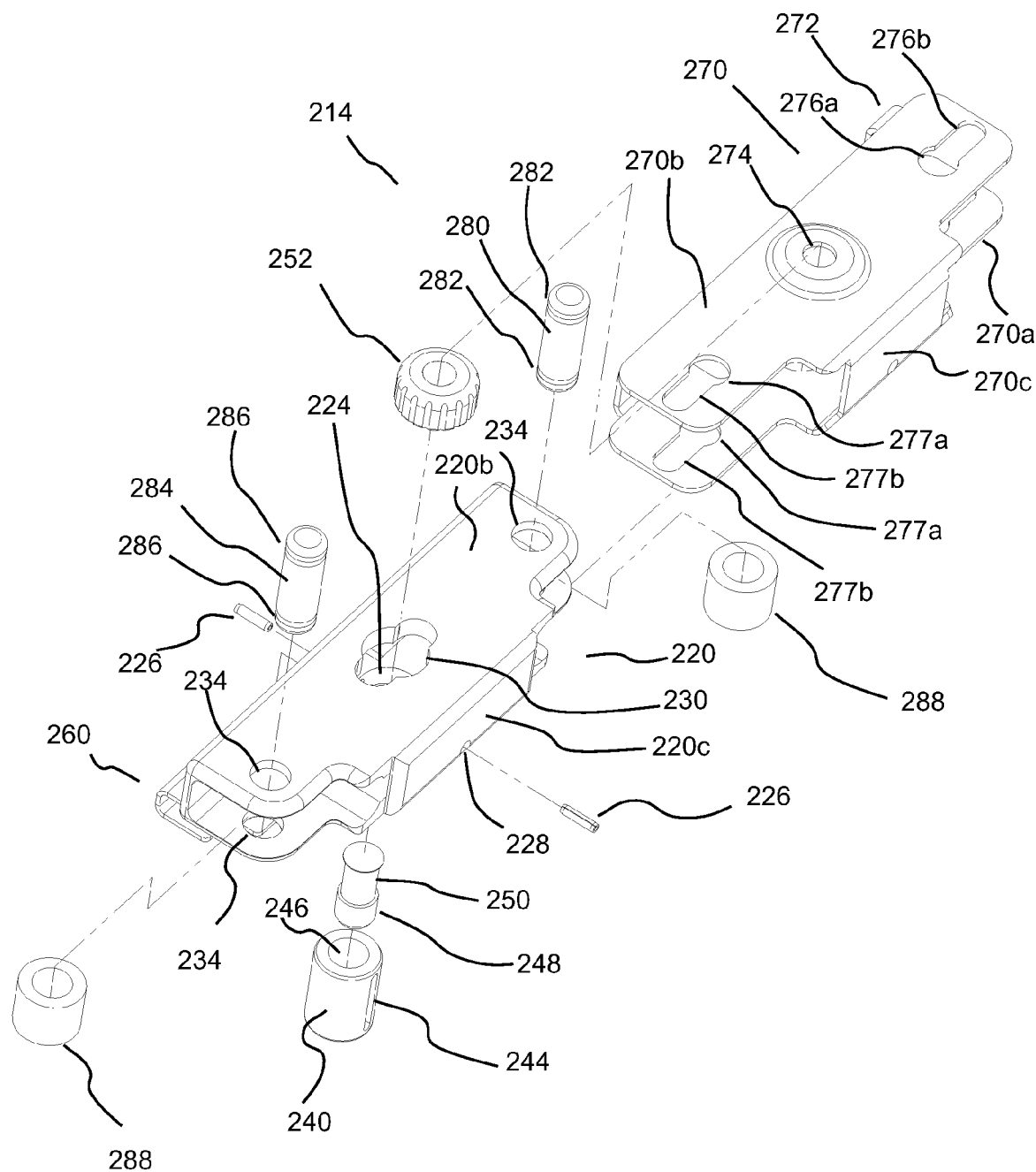
FIG. 17I illustrates a bottom, perspective exploded view of the connector of the system of FIG. 17A.
Figure 18E:
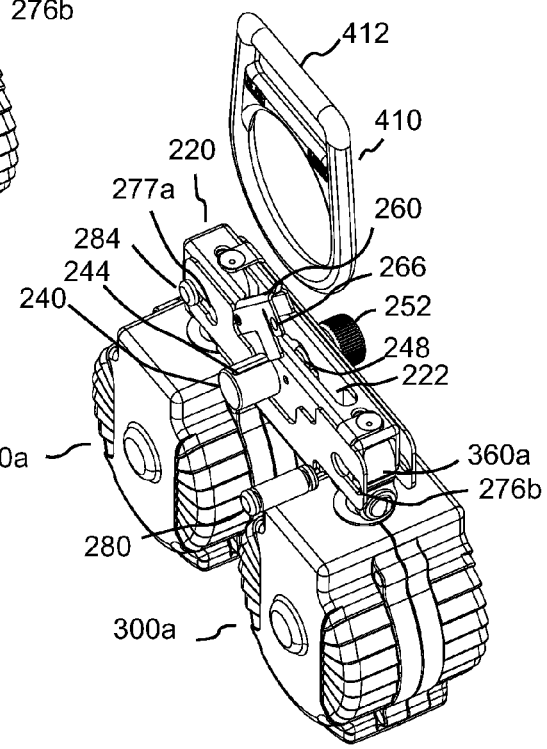
FIG. 18E illustrates a front perspective view of the connector and removal of the first retaining pin.

Once bracket 270 is slid to the second position illustrated in FIG. 18D, device attachment pin 280 can be removed and set aside as illustrated in FIG. 18E. At this point, device attachment bushing 288 is placed into self retracting lifeline clevis 360a (see, FIG. 17F) until generally flush. While maintaining attachment bushing 288 within clevis 360a, attachment bushing 288 is slid into the space between front frame member 220a and rear frame member 220b of frame 220 and align passages 276a and passages 234. Device attachment pin 280 is passed through passages 276a, passages 234 and through a central passage or hole in attachment bushing 288. Once device attachment pin 280 is so engaged and protrudes generally equally to the front and to the rear of rigid member 220, device attachment bracket 270 can be slid to it's first, neutral or detent position, thereby engaging both seatings 282 of device attachment pin 280 with keyhole slots 276b to capture device attachment pin 276b.

Figure 18F:
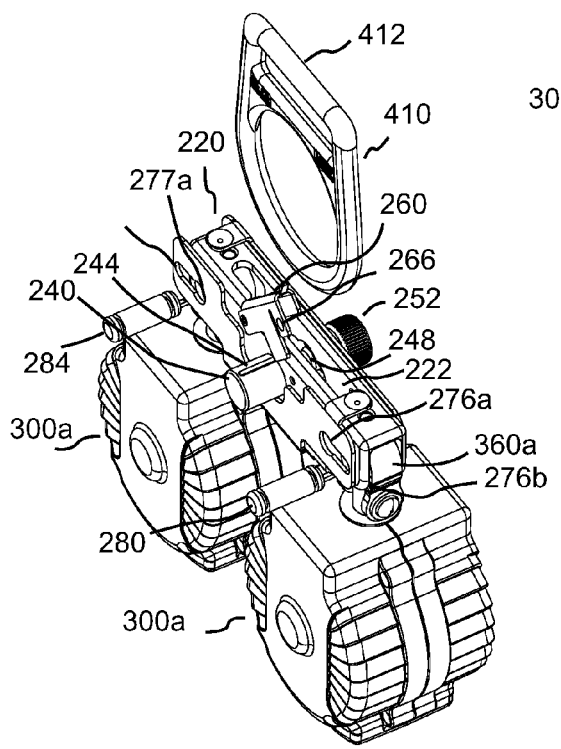
FIG. 18F illustrates a front perspective view of the connector wherein the sliding retainer bracket has been slid to the second side and the second retaining pin has been removed to allow removal of a second self-retracting lifeline from connection with the connector.

To attach another self-retracting lifelines 300a (or other elements) to connector 214, the above process is repeated, but device attachment or retainer bracket 270 is slid in the opposite direction (that is, to the left) to a third position as illustrated in FIG. 18F to first enable removal of a second device attachment pin 284 through passages 277a and passages 234. After attaching a second self-retracting lifeline 300a via pin 284, bracket 270 is slid to the first, neutral or detent position so that keyhole slots 277b engage seatings 286 in device attachment pin 284. At this point, attachment pin 240 can be engaged with bolt or shaft 250 as described above, and catch lever 260 can be place in abutting engagement with attachment pin 240.

Figure 19A:
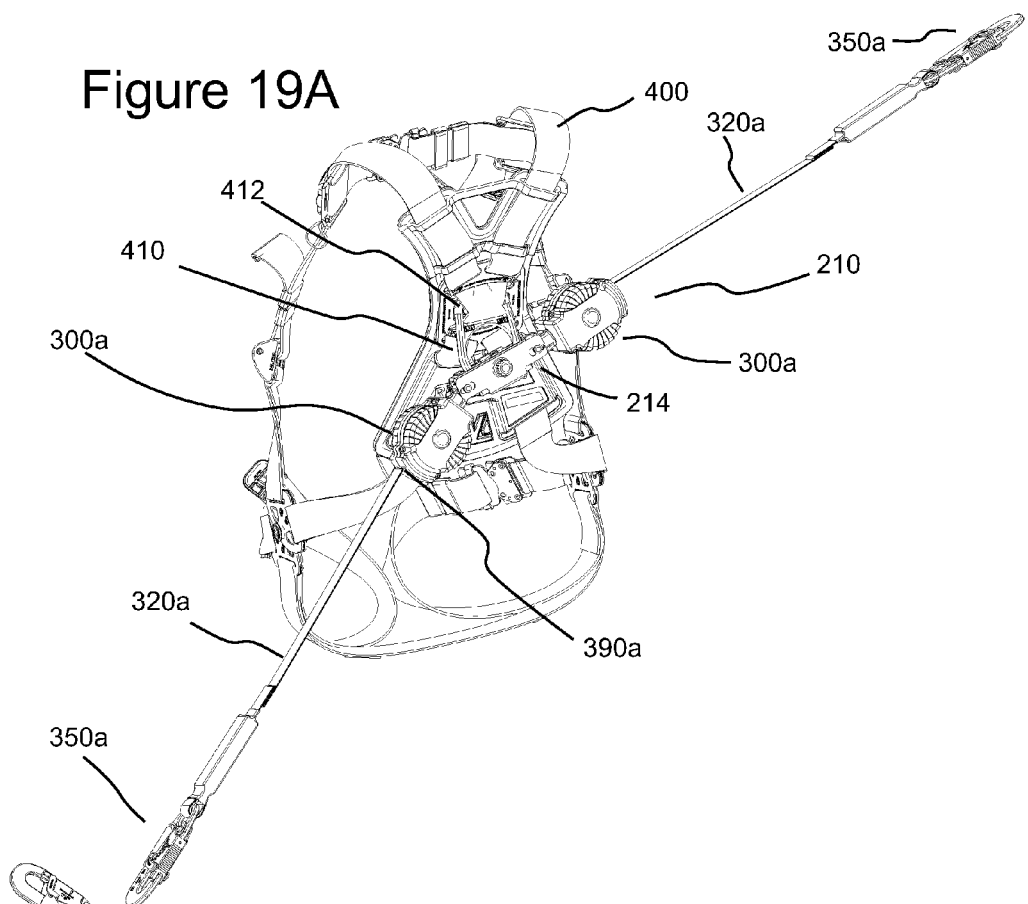
FIG. 19A illustrates a perspective view the system of FIG. 17A attached to a harness D-ring, and illustrates the freedom of motion of each of the self-retracting lifelines attached to the connector of the system.
Figure 19B:
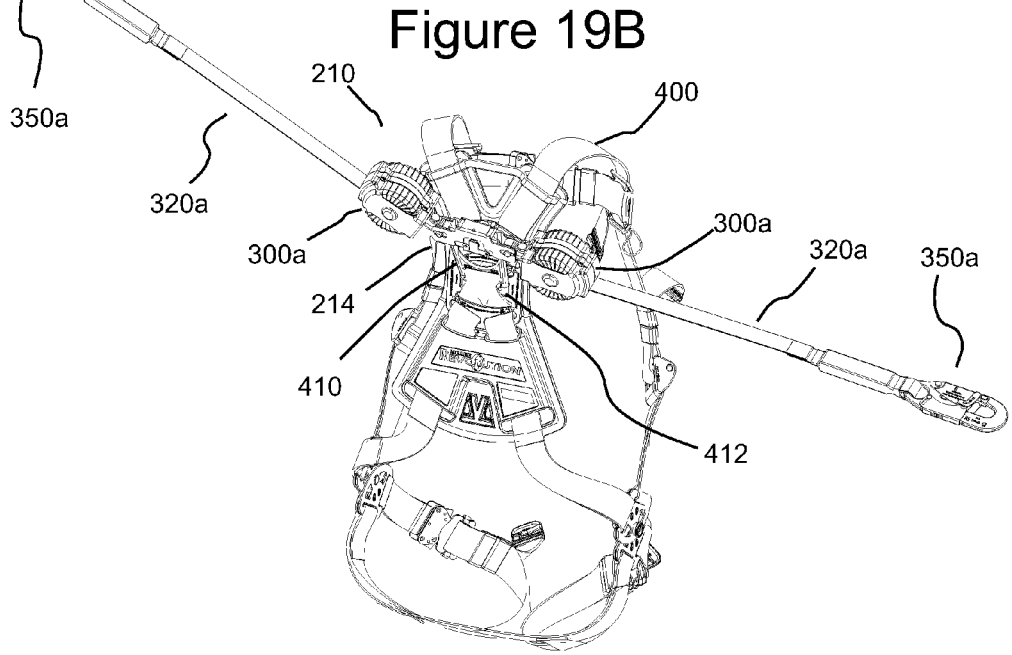
FIG. 19B illustrates another perspective view the system of FIG. 17A attached to a harness D-ring, and further illustrates the freedom of motion of each of the self-retracting lifelines attached to the connector of the system.

FIGS. 19A and 19B are indicative of the range of motion provided by system 210, which is substantially greater than the range of motion provide by systems 10 and 110. As described above, in the embodiment of FIGS. 17A through 19B, connector 214 attaches to, for example, back D-Ring 410 of harness 400 via single attachment pin 240. In the illustrated embodiment, connector 214 allows each attached device (self-retracing lifelines 300a in the illustrated embodiment) to rotate approximately 90 degrees about axes $A^2$ (see FIG. 17A) as defined by attachment pins 280 and 284. Inherent to connectors 344a of self-retracting lifeline assemblies 300a, housing 340a of each self-retracting lifeline 300a is able to pivot approximately 150 degrees about axes $A^1$ (relative to connector 344a and to frame 220) and rotate 360 degrees about longitudinal axes A (relative to connector 344a and to frame 220) (see FIG. 17A). As, for example, represented by arrows F in FIG. 17A and illustrated in FIG. 19A, the connection between connector 214 and the harness D-Ring 410 in one embodiment allows approximately 30 degrees of motion (rotation of connector 214, generally about pin 240, in the plane defined by D-ring 410), for example, aid in alignment with anchor point(s). More or less rotation about D-ring 410 can be provided. Furthermore, as represented by arrows D in FIG. 17A, inherent to the motion of D-Ring 410 relative to harness 400, D-Ring 410 and system 210 are able to rotate (generally about an axis defined by transverse member 412 as illustrated in FIG. 17A) approximately 150 degrees relative to harness 400 (compare FIGS. 19A and 19B).

As illustrated, for example, in FIGS. 19A and 19B, the freedom of motion of self-retracting lifelines 300a relative to connector 214/frame 220 (as well as the freedom of movement of D-ring 410 and connector 214 relative to safety harness 400), allow housings 340a to be free to move (independently) toward or into alignment with the orientations their respective lifelines 320a, which exits housings 340a at exit 390a formed in housings 340a (see FIG. 19A). Bends in lifelines 320a at exits 390a of housings 340a, which can detrimentally make extension of lifeline 320a difficult, hinder automatic retraction of lifeline 320a and allow extra slack in lifeline 320a, can be minimized or avoided.

In the embodiments set forth above, lateral pivoting of self-retracting lifelines 300a occurs about the axes of extending members or attachment pins 280 and 284. As clear to one skilled in the art, however, lateral pivoting or rotation of the self-retracting lifeline housing can be provided by or inherent in a connector of the self-retracting lifeline (similar to the rotation provided about axes $A^1$ and A), and such a connector can be fixed or immovably attached to a connector similar to connector 214.

By encompassing a portion of D-ring 410 within connector 214, the fall clearance is reduced as compared to, for example, embodiments in which such a connector is attached to a D-ring via an intervening connector or attachment element. The vertical (in, for example, the orientation of FIG. 17F) position of attachment pin 240 relative to device attachment pins 280 and 284 determines the distance which self-retracting lifeline 300a will be spaced from harness 400 and the person wearing harness 400. As illustrated in, for example, FIG. 17F device attachment pins 280 and 284 are generally vertically aligned with attachment pin 240, resulting in self-retracting lifelines 300a being spaced a distance from harness 400 which is less than a resulting spacing distance if a self-retracting lifeline 300a and had been connected to D-ring 410 via an intervening connector such as a snap hook as is common in the art. Device attachment pins 280 and 284 can, for example, be positioned on frame 240 equidistant from attachment pin 244 to provide balance.

Uninterrupted tie off is provided with a wide range of movement for a worker either using both self-retracting lifelines 300a during a transition from one anchor point to another, or when using a single self-retracting lifeline with a single anchor point. Although a wide range of motion is provided, the two devices (for example, self-retracting lifelines 300a) attached to connector 214 are kept separate and are somewhat restricted in their interaction to reduce the possibility of interference. In that regard, self-retracing lifelines 300a can, for example, be prevented from pivoting toward each other (about attachment pins 280 and 284) by an abutment of frame 220 with self-retracting lifeline connector 344a.

Figure 20A:
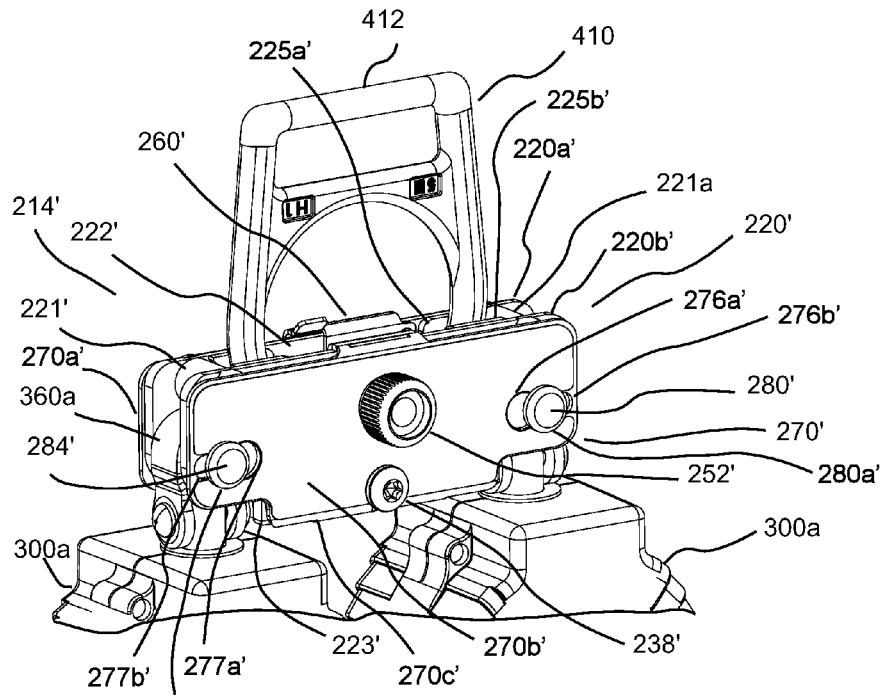
FIG. 20A illustrates a perspective view of another embodiment of a system of the present invention.
Figure 20B:
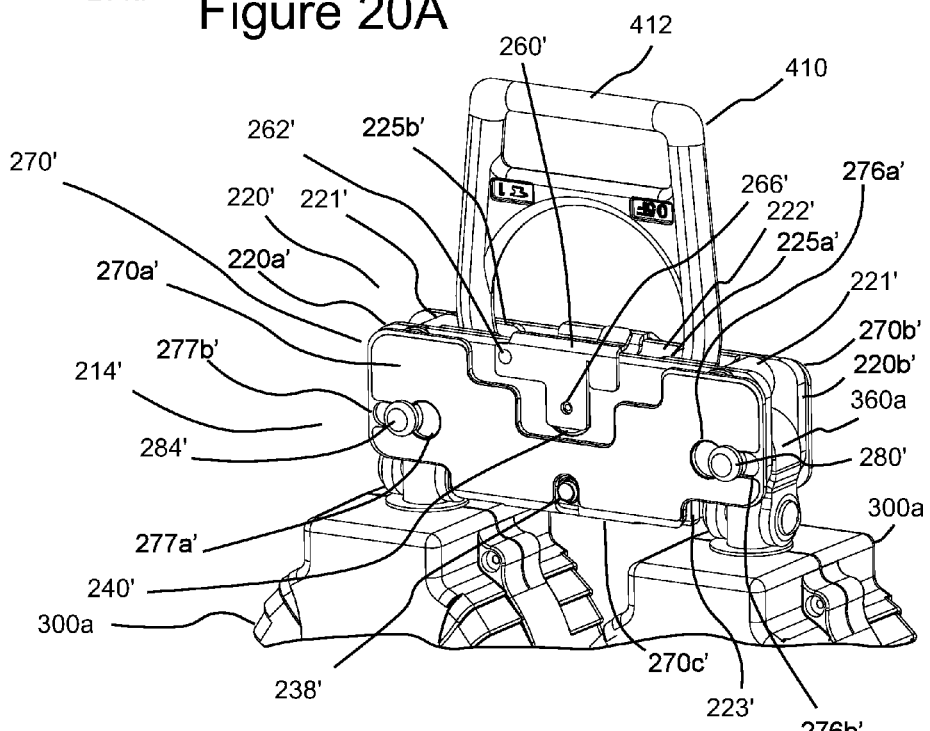
FIG. 20B illustrates another perspective view of the system of FIG. 20A.

FIGS. 20a and 20B illustrate another embodiment of a connector 214' including a frame 220'. Frame 220' is similar in operation to frame 220 and corresponding components of frame 220' are designated similarly to like components of frame 220 with addition of the designation "'" thereto. Frame 220' includes a space or gap 222' between a front frame member 220a' and a rear frame member 220b', which are formed as separate components and connected via connectors such as rivets and cooperating separation members (for example, spacer 221'). A determined or defined spacing is maintained between front frame member 220a' and rear frame member 220b' using spacers such as upper spacers 221' and lower spacer 223'. D-ring 410 can be inserted within space 222' between spacers 221', which form a space or slot therebetween in a like fashion to space or slot 222 (see FIGS. 18A through 18C). D-ring 410 can be separated or spaced from contact with frame members 220a' and 220b' (which are typically made of a metal) by spacing pads 225a' and 225b', respectively, which can be made of a polymeric material (for example, a plastic) and can help in preventing wear of D-ring 410 and frame members 220a' and 220b'. In several embodiments, spacing pads 225a' and 225b' were adhered to front frame member 220a' and rear frame member 200b', respectively, using, for example, a pressure sensitive adhesive. D-ring 410 is placed in removable connection with frame 220' in essentially the same manner as described above in connection with frame 220.

To attach self retracting lifelines 300a (and/or other elements such as safety devices) to frame 220' in the embodiment illustrated in FIGS. 20A and 20B, one first disengages the D-ring attachment pin 240' (see FIG. 20B) using knob 252' in the manner described in connection with knob 252 and D-ring attachment pin 240. One then removes a slide lock bolt 238' (for example, using a hex wrench), which operates to center retainer bracket 270' in a first position and prevent movement of a sliding retaining bracket 270' (similar to the operation of tabs 272 in the embodiment of frame 220). Retainer bracket 270' is slidably positioned on frame 220' and operates in the manner described in connection with bracket 270. Extending members 280' and 284' can include an enlarged portion or head 280a' and 284a', respectively, (see FIG. 20A) to assist in preventing unwanted complete detachment thereof during removal or attachment of self-retracting lifelines 300a.

As illustrated in FIG. 21, a connector such as connector 214 can further include another device attachment 290. In the illustrated embodiment, attachment 290 includes a passage 292 through which, for example, a carabiner 600 or other device can be attached (either removably or nonremovably) to connector 214. Carabiner 600 can, for example, be used in a rescue after a fall.

Similar to the embodiment discussed in connection with FIGS. 16A through 16E, connector 120a that can be used to directly attached a system 210a illustrated in FIGS. 22A through 22C to, for example, a D-ring or to harness webbing. In system 210", connector 120a is attached to the top of a rigid member such as a frame 220". In respects other than the use of connector 120a, system 210" operates similarly to system 210. Connectors such as connector 120a also assist in maintaining the systems of the present invention in close connection with a safety harness, thereby assisting in minimizing fall clearance.

Figure 23:
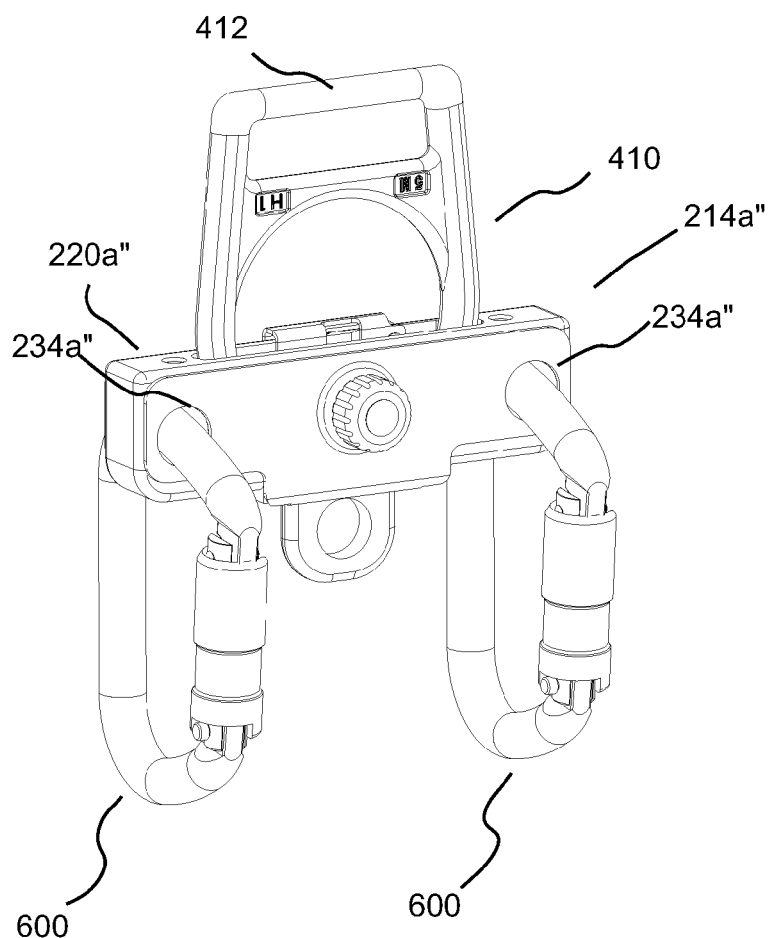
FIG. 23 illustrates a rear perspective view the connector of the present invention including two carabiners attached thereto instead of attachment members for self-retracting lifelines.

As described above, other devices can be connected to the connectors of the present invention. For example, carabiners, snap hooks etc. can be connected to device attachment pins 280 and 284 or connector 214. Further, FIG. 23 illustrates another embodiment of a connector 214a" wherein a frame member 220a" includes passages 234a" via which attachments and/or devices such a carabiners 600 can be attached.

The support systems of the present invention provide several significant advantages. For example, the independent pivoting or swinging action of the self-retracting lifeline housings and/or other degrees of freedom of motion thereof permit the lifeline webbing of each self-retracting lifeline to feed easily during extension and retraction even when the lifeline extends to the side of the user. In the event of a breakage or malfunction in one of the self-retracting lifelines, the self-retracting lifeline may be quickly and easily replaced in the field. Since the support systems of the present invention makes use of complete self-retracting lifeline assemblies, production of a dual self-retracting lifeline system of the present invention can be accomplished quickly and at relatively low cost by manufacturing the few simple parts (such as, the frames, retainer, etc.) which make up the support systems of the present invention. The self-retracting lifelines can be used independently as a safety device or can be installed in the systems of the present invention as part of a multi- or dual self-retracting lifeline system. Once again, the individual self-retracting lifelines used in the systems of the present invention can be stand alone products. Existing self-retracting lifeline can be used (with or without minor modification) in the systems of the present invention.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A system, comprising:
a support comprising an extending rigid member, a first attachment at a first fixed position on the rigid member to which a first self-retracting lifeline is attached, the first self-retracting lifeline comprising a first housing from which a first lifeline exits, the first housing being movable relative to the rigid member, and at least a second attachment at a second fixed position on the rigid member to which a second self-retracting lifeline is attached, the second self-retracting lifeline comprising a second housing from which a second lifeline exits, the second housing being movable relative to the rigid member independent of the movement of the first housing, the first fixed position being spaced from the second fixed position by a fixed distance; and
a connector attached to the support to connect the support to an article worn by a user.

2. The system of claim 1 wherein the first self-retracting lifeline is pivotably attached to the first attachment and the second self-retracting lifeline is pivotably attached to the second attachment.

3. The system of claim 1 wherein the first self-retracting lifeline is pivotable laterally with respect to the rigid member and the second self-retracting lifeline is pivotable laterally with respect to the rigid member.

4. The system of claim 3 wherein the first attachment is a first extending member about which the first self-retracting lifeline can pivot and the second attachment is a second extending member about which the second self-retracting lifeline can pivot.

5. The system of claim 4 wherein the rigid member comprises a frame comprising a first frame member and a second frame member spaced from the first frame member, the first extending member extending between the first frame member and the second frame member at the first position and the second extending member extending between the first frame member and the second frame member at the second position.

6. The system of claim 5 wherein the first extending member is removably connectible between the first frame member and the second frame member and the second extending member is removably connectible between the first frame member and the second frame member.

7. The system of claim 6 further comprising at least one retaining element movably connected to the frame to selectively engage the first extending member to retain the first extending member between the first frame member and the second frame member.

8. The system of claim 7 wherein the retaining element is also movably connected to the frame to selectively engage the second extending member to retain the second extending member between the first frame member and the second frame member.

9. The system of claim 8 wherein the retaining element is pivotably or slidably connected to the frame to a first retaining element position in which the retaining element retains each of the first extending member and the second extending member between the first frame member and the second frame member and to at least a second retaining element position in which at least one of the first extending member and the second extending member can be removed from between the first frame member and the second frame member to enable removal of one of the first self-retracting lifeline and the second retracting lifeline from attachment to the frame.

10. The system of claim 9 wherein the retaining element is movable to at least a third retaining element position in which the other of the first extending member and the second extending member can be removed from between the first frame member and the second frame member to enable removal of the other of the first self-retracting lifeline and the second retracting lifeline from attachment to the frame.

11. The system of claim 6 wherein the system comprises a third extending member extendible between the first frame member and the second frame member to connect to a cooperating connector attached to the article.

12. The system of claim 11 wherein the third extending member is movably connected to the frame.

13. The system of claim 11 wherein the third extending member is positioned on the frame at a position intermediate between the first extending member and the second extending member and generally equidistant from the first extending member and the second extending member.

14. The system of claim 13 wherein the cooperating connector can pivot about the third extending member over a range of angles.

15. A system, comprising:
a support comprising an extending rigid member, a first attachment at a first position on the rigid member to which a first self-retracting lifeline is attached, the first self-retracting lifeline comprising a first housing from which a first lifeline exits, the first housing being movable relative to the rigid member, and at least a second attachment at a second position on the rigid member to which a second self-retracting lifeline is attached, the second self-retracting lifeline comprising a second housing from which a second lifeline exits, the second housing being movable relative to the rigid member independent of the movement of the first housing, the first position being spaced from the second position; and
a connector attached to the support to connect the support to an article worn by a user;
wherein the first self-retracting lifeline is pivotable laterally with respect to the rigid member and the second self-retracting lifeline is pivotable laterally with respect to the rigid member; and
wherein at least a portion of the connector is disconnectible from the rigid member to connect to at least one strap of the article.

16. The system of claim 15 wherein the connector comprises a connector member that is pivotably connected to the support on a first end thereof and is removably connected to the support on a second end thereof.

17. The system of claim 16 wherein the connector member comprises an engagement member in the vicinity of the second end thereof that is operable to removably connect to a cooperating engagement member attached to the support.

18. The system of claim 17 wherein the engagement member comprises an extending member that engages a seating in the cooperating engagement member.

19. The system of claim 18 wherein the connector further comprises a latch system to engage at least one of the engagement member and the cooperating engagement member to prevent disengagement of the engagement member and the cooperating engagement member when the latch system is in a closed state.

20. The system of claim 3 wherein the first self-retracting lifeline and the second self-retracting lifeline are positioned generally side by side.

21. The system of claim 3 further comprising the article and the article is a safety harness.

22. The system of claim 3 wherein the first self-retracting lifeline is removably attached to the first attachment and the second self-retracting lifeline is removably attached to the second attachment.

23. The system of claim 4 wherein the first retractable lifeline comprises a first connector including a first passage through which the first extending member passes to pivotably attach the first retractable lifeline to the rigid member and the second retractable lifeline comprises a second connector including a second passage through which the second extending member passes to pivotably attach the second retractable lifeline to the rigid member.

24. The system of claim 23 wherein the first housing is rotatable about a longitudinal axis of the first housing relative to the first connector and the second housing is rotatable about a longitudinal axis of the second housing relative to the second connector.

25. The system of claim 23 wherein the first housing is rotatable relative to the first connector about an axis generally perpendicular to the longitudinal axis of the first housing and the second housing is rotatable relative to the second connector about an axis generally perpendicular to the longitudinal axis of the second housing.

* * * * *